US009348511B2

(12) United States Patent
Ording et al.

(10) Patent No.: US 9,348,511 B2
(45) Date of Patent: *May 24, 2016

(54) METHOD, SYSTEM, AND GRAPHICAL USER INTERFACE FOR POSITIONING AN INSERTION MARKER IN A TOUCH SCREEN DISPLAY

(75) Inventors: Bas Ording, San Francisco, CA (US); Marcel Van Os, San Francisco, CA (US); Kenneth Kocienda, Sunnyvale, CA (US); Richard Williamson, Los Gatos, CA (US); Scott Forstall, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 1489 days.

This patent is subject to a terminal disclaimer.

(21) Appl. No.: 12/964,679

(22) Filed: Dec. 9, 2010

(65) Prior Publication Data

US 2011/0080364 A1  Apr. 7, 2011

Related U.S. Application Data

(63) Continuation of application No. 11/553,436, filed on Oct. 26, 2006, now Pat. No. 7,856,605.

(51) Int. Cl.
*G06F 3/0481* (2013.01)
*G06F 3/0488* (2013.01)

(52) U.S. Cl.
CPC .......... *G06F 3/04886* (2013.01); *G06F 3/0488* (2013.01)

(58) Field of Classification Search
CPC .............. G06F 3/0481; G06F 3/04812; G06F 2203/04801
See application file for complete search history.

(56) References Cited

U.S. PATENT DOCUMENTS

| 4,332,464 A | 6/1982 | Bartulis et al. ................. 355/14 |
| 4,680,429 A | 7/1987 | Murdock et al. ............... 178/19 |
| 4,698,625 A | 10/1987 | McCaskill et al. ............ 340/709 |
| 4,755,811 A | 7/1988 | Slavin et al. .................. 340/731 |
| 4,790,028 A | 12/1988 | Ramage ......................... 382/47 |

(Continued)

FOREIGN PATENT DOCUMENTS

| CN | 1129889 A | 8/1996 |
| CN | 1293807 A | 5/2001 |

(Continued)

OTHER PUBLICATIONS

Advances in Human-Computer Interaction, Chapters 1, 5, and 6, Ablex Publishing Corporation, 1992, 121 pages.
Bederson et al., "The Craft of Information Visualization," Elsevier Science (USA) 2003, 435 pages.
Benel et al., "Optimal Size and Spacing of Touch Screen Input Areas," INTERACT'87—2nd IFIP International Conference on Human-Computer Interaction, Sep. 1-4, 1987, Stuttgart, Germany, 5 pages.

(Continued)

*Primary Examiner* — Shen Shiau
(74) *Attorney, Agent, or Firm* — Morrison & Foerster LLP

(57) ABSTRACT

An insertion marker that is displayed on a touch screen may be moved by a user via an insertion marker placement aid. The insertion marker placement aid is displayed on the touch screen after a contact with the touch screen is detected. The insertion marker placement aid provides visual feedback to the user, indicating that the insertion marker is subject to repositioning by the user. When the contact is moved across the touch screen, the insertion marker and the insertion marker placement aid is moved in accordance with the movement of the contact. When the contact is broken (i.e., no longer detected), the insertion marker placement aid is removed from display and the insertion marker comes to rest.

19 Claims, 12 Drawing Sheets

(56) References Cited

U.S. PATENT DOCUMENTS

| | | | | |
|---|---|---|---|---|
| 5,016,002 | A | 5/1991 | Levanto | 340/756 |
| 5,027,110 | A | 6/1991 | Chang et al. | 340/731 |
| 5,053,758 | A | 10/1991 | Cornett et al. | 340/712 |
| 5,079,723 | A | 1/1992 | Herceg et al. | 395/156 |
| 5,119,079 | A | 6/1992 | Hube et al. | 340/712 |
| 5,201,034 | A | 4/1993 | Matsuura et al. | 395/155 |
| 5,260,697 | A | 11/1993 | Barrett et al. | 345/173 |
| 5,266,931 | A | 11/1993 | Tanaka | 345/173 |
| 5,266,949 | A | 11/1993 | Rossi | 341/22 |
| 5,319,386 | A | 6/1994 | Gunn et al. | 345/173 |
| 5,326,270 | A | 7/1994 | Ostby et al. | 434/362 |
| 5,335,276 | A | 8/1994 | Thompson et al. | 380/21 |
| 5,341,293 | A | 8/1994 | Vertelney et al. | 364/419.17 |
| 5,341,466 | A | 8/1994 | Perlin et al. | 395/139 |
| 5,347,295 | A | 9/1994 | Agulnick et al. | |
| 5,367,453 | A | 11/1994 | Capps et al. | |
| 5,408,060 | A | 4/1995 | Muurinen | 200/314 |
| 5,422,656 | A | 6/1995 | Allard et al. | 345/173 |
| 5,459,488 | A | 10/1995 | Geiser | 345/173 |
| 5,463,725 | A | 10/1995 | Henckel et al. | 395/155 |
| 5,465,401 | A | 11/1995 | Thompson | 455/89 |
| 5,483,261 | A | 1/1996 | Yasutake | 345/173 |
| 5,488,204 | A | 1/1996 | Mead et al. | 178/18 |
| 5,511,148 | A | 4/1996 | Wellner | 395/106 |
| 5,523,775 | A | 6/1996 | Capps | |
| 5,543,588 | A | 8/1996 | Bisset et al. | 178/18 |
| 5,543,897 | A | 8/1996 | Altrieth, III | 355/209 |
| 5,553,225 | A | 9/1996 | Perry | |
| 5,565,888 | A | 10/1996 | Selker | 345/146 |
| 5,568,536 | A | 10/1996 | Tiller et al. | 379/58 |
| 5,579,037 | A | 11/1996 | Tahara et al. | 345/173 |
| 5,589,856 | A | 12/1996 | Stein et al. | 345/173 |
| 5,615,384 | A | 3/1997 | Allard et al. | 395/800 |
| 5,625,710 | A | 4/1997 | Katsuyama et al. | |
| 5,638,523 | A | 6/1997 | Mullet et al. | 395/326 |
| 5,640,580 | A | 6/1997 | Slayden et al. | |
| 5,673,338 | A | 9/1997 | Denenberg et al. | |
| 5,689,287 | A | 11/1997 | Mackinlay et al. | |
| 5,710,831 | A | 1/1998 | Beernink et al. | 382/189 |
| 5,721,939 | A | 2/1998 | Kaplan | |
| 5,736,974 | A | 4/1998 | Selker | 345/146 |
| 5,754,873 | A | 5/1998 | Nolan | 395/789 |
| 5,757,358 | A | 5/1998 | Osga | 345/146 |
| 5,760,773 | A | 6/1998 | Berman et al. | 345/347 |
| 5,778,404 | A | 7/1998 | Capps et al. | 707/531 |
| 5,815,142 | A | 9/1998 | Allard et al. | 345/173 |
| 5,825,352 | A | 10/1998 | Bisset et al. | 345/173 |
| 5,835,079 | A | 11/1998 | Shieh | 345/173 |
| 5,874,965 | A | 2/1999 | Takai et al. | |
| 5,877,751 | A | 3/1999 | Kanemitsu et al. | 345/173 |
| 5,880,411 | A | 3/1999 | Gillespie et al. | 178/18.01 |
| 5,910,800 | A | 6/1999 | Shields et al. | 345/336 |
| 5,910,801 | A | 6/1999 | Rosenburg et al. | |
| 5,926,769 | A | 7/1999 | Valimaa et al. | 455/564 |
| 5,943,043 | A | 8/1999 | Furuhata et al. | 345/173 |
| 5,956,021 | A | 9/1999 | Kubota et al. | 345/179 |
| 5,967,996 | A | 10/1999 | Kadota et al. | 600/544 |
| 5,977,950 | A | 11/1999 | Rhyne | 345/145 |
| 5,982,352 | A | 11/1999 | Pryor | 345/156 |
| 6,020,881 | A | 2/2000 | Naughton et al. | 345/327 |
| 6,037,939 | A | 3/2000 | Kashiwagi et al. | 345/342 |
| 6,049,326 | A | 4/2000 | Beyda et al. | 345/157 |
| 6,054,990 | A | 4/2000 | Tran | 345/358 |
| 6,073,036 | A | 6/2000 | Heikkinen et al. | 455/575 |
| 6,121,960 | A | 9/2000 | Carroll et al. | 345/173 |
| 6,157,935 | A | 12/2000 | Tran et al. | 707/503 |
| 6,173,194 | B1 | 1/2001 | Vanttila | 455/566 |
| 6,188,391 | B1 | 2/2001 | Seely et al. | 345/173 |
| 6,262,735 | B1 | 7/2001 | Eteläperä | 345/357 |
| 6,295,390 | B1 | 9/2001 | Kobayashi et al. | 382/313 |
| 6,310,610 | B1 | 10/2001 | Beaton et al. | 345/173 |
| 6,323,846 | B1 | 11/2001 | Westerman et al. | 345/173 |
| 6,411,283 | B1 | 6/2002 | Murphy | 345/173 |
| 6,525,749 | B1 | 2/2003 | Moran et al. | 345/863 |
| 6,563,913 | B1 | 5/2003 | Kaghazian | |
| 6,570,557 | B1 | 5/2003 | Westerman et al. | 345/173 |
| 6,643,824 | B1 | 11/2003 | Bates et al. | |
| 6,664,989 | B1 | 12/2003 | Snyder et al. | 345/856 |
| 6,664,991 | B1 | 12/2003 | Chew et al. | |
| 6,677,932 | B1 | 1/2004 | Westerman | 345/173 |
| 6,690,387 | B2 | 2/2004 | Zimmerman et al. | 345/684 |
| 6,822,635 | B2 | 11/2004 | Shahoian et al. | |
| 6,850,220 | B2 | 2/2005 | Sakaguchi | 345/157 |
| 6,888,536 | B2 | 5/2005 | Westerman et al. | 345/173 |
| 6,938,222 | B2 | 8/2005 | Hullender et al. | |
| 6,971,068 | B2 | 11/2005 | Bates et al. | |
| 7,015,894 | B2 | 3/2006 | Morohoshi | 345/156 |
| 7,030,861 | B1 | 4/2006 | Westerman et al. | 345/173 |
| 7,047,503 | B1 | 5/2006 | Parrish et al. | 715/863 |
| 7,075,512 | B1 | 7/2006 | Fabre et al. | 345/156 |
| 7,084,859 | B1 | 8/2006 | Pryor | 345/173 |
| 7,088,344 | B2 | 8/2006 | Maezawa et al. | 345/173 |
| 7,103,852 | B2 | 9/2006 | Kairis, Jr. | |
| 7,123,243 | B2 | 10/2006 | Kawasaki et al. | 345/173 |
| 7,148,499 | B2 | 12/2006 | Lapstun et al. | |
| 7,184,064 | B2 | 2/2007 | Zimmerman et al. | 345/684 |
| 7,213,214 | B2 | 5/2007 | Baar et al | |
| 7,218,226 | B2 | 5/2007 | Wehrenberg | 340/571 |
| 7,268,772 | B2 | 9/2007 | Kawai et al. | 345/173 |
| 7,305,630 | B2 | 12/2007 | Hullender et al. | |
| 7,319,457 | B2 | 1/2008 | Lin et al. | |
| 7,408,538 | B2 | 8/2008 | Hinckley et al. | |
| 7,469,381 | B2 | 12/2008 | Ording | |
| 7,479,949 | B2 * | 1/2009 | Jobs | G06F 3/0488 345/169 |
| 7,480,870 | B2 | 1/2009 | Anzures et al. | |
| 7,509,588 | B2 | 3/2009 | Van Os et al. | |
| 7,536,656 | B2 | 5/2009 | Hullender et al. | |
| 7,565,613 | B2 | 7/2009 | Forney | |
| 7,614,008 | B2 | 11/2009 | Ording | 715/773 |
| 7,633,076 | B2 | 12/2009 | Huppi et al. | 250/559.36 |
| 7,650,137 | B2 | 1/2010 | Jobs et al. | |
| 7,653,883 | B2 | 1/2010 | Hotelling et al. | 715/863 |
| 7,657,849 | B2 | 2/2010 | Chaudhri et al. | 715/863 |
| 7,663,607 | B2 | 2/2010 | Hotelling et al. | 345/173 |
| 7,683,888 | B1 | 3/2010 | Kennedy | |
| 7,683,889 | B2 | 3/2010 | Rimas Ribikauskas et al. | |
| 7,692,637 | B2 | 4/2010 | Davis | |
| 7,694,231 | B2 | 4/2010 | Kocienda et al. | |
| 7,705,830 | B2 | 4/2010 | Westerman et al. | 345/173 |
| 7,743,348 | B2 | 6/2010 | Robbins et al. | |
| 7,760,187 | B2 | 7/2010 | Kennedy | 345/173 |
| 7,760,925 | B2 | 7/2010 | Sakurai et al. | |
| 7,768,536 | B2 | 8/2010 | Hyatt | |
| 7,808,479 | B1 | 10/2010 | Hotelling et al. | |
| 7,812,826 | B2 | 10/2010 | Ording et al. | |
| 7,818,691 | B2 | 10/2010 | Irvine | |
| 7,856,605 | B2 * | 12/2010 | Ording | G06F 3/0488 345/173 |
| 7,864,163 | B2 | 1/2011 | Ording et al. | |
| 7,889,212 | B2 | 2/2011 | Schulz et al. | |
| 7,957,762 | B2 | 6/2011 | Herz et al. | |
| 7,957,955 | B2 | 6/2011 | Christie et al. | |
| 8,006,002 | B2 | 8/2011 | Kalayjian et al. | |
| 8,042,042 | B2 | 10/2011 | Kim et al. | |
| 8,074,172 | B2 | 12/2011 | Kocienda et al. | |
| 8,130,205 | B2 * | 3/2012 | Forstall | G06F 3/0482 345/173 |
| 8,201,109 | B2 | 6/2012 | Van Os et al. | |
| 8,223,134 | B1 * | 7/2012 | Forstall | G06F 3/0482 345/173 |
| 8,239,784 | B2 | 8/2012 | Hotelling et al. | |
| 8,255,798 | B2 | 8/2012 | Ording | |
| 8,255,830 | B2 * | 8/2012 | Ording | G06F 1/1626 715/711 |
| 8,352,877 | B2 | 1/2013 | Beatty et al. | |
| 8,368,665 | B2 * | 2/2013 | Forstall | G06F 3/0482 345/173 |
| 8,370,736 | B2 * | 2/2013 | Ording | G06F 1/1626 715/234 |
| 8,381,135 | B2 | 2/2013 | Hotelling et al. | |
| 8,400,417 | B2 * | 3/2013 | Ording | G06F 3/0488 345/173 |

(56) References Cited

U.S. PATENT DOCUMENTS

| | | | |
|---|---|---|---|
| 8,407,603 B2 * | 3/2013 | Christie | G06F 3/04883 715/751 |
| 8,416,205 B2 | 4/2013 | Rapp et al. | |
| 8,510,665 B2 * | 8/2013 | Ording | G06F 1/1626 715/762 |
| 8,564,544 B2 * | 10/2013 | Jobs | G06F 3/0488 345/173 |
| 8,570,278 B2 * | 10/2013 | Kocienda | G06F 3/04886 345/173 |
| 8,584,050 B2 * | 11/2013 | Ording | G06F 1/1626 345/173 |
| 8,661,362 B2 * | 2/2014 | Kocienda | G06F 1/1626 345/171 |
| 8,689,132 B2 * | 4/2014 | Lamiraux | G06F 3/0482 715/702 |
| 8,756,534 B2 * | 6/2014 | Ording | G06F 1/1626 345/173 |
| 9,207,855 B2 * | 12/2015 | Kocienda | G06F 3/04886 |
| 2001/0040587 A1 | 11/2001 | Scheck | 345/676 |
| 2002/0003469 A1 | 1/2002 | Gupta | |
| 2002/0011993 A1 | 1/2002 | Lui et al. | |
| 2002/0015024 A1 | 2/2002 | Westerman et al. | |
| 2002/0030665 A1 | 3/2002 | Ano | 345/168 |
| 2002/0030699 A1 | 3/2002 | Van Ee | |
| 2002/0039108 A1 | 4/2002 | Roy et al. | |
| 2002/0059350 A1 | 5/2002 | Iwema et al. | 707/530 |
| 2002/0067346 A1 * | 6/2002 | Mouton | 345/173 |
| 2002/0069220 A1 | 6/2002 | Tran | 707/503 |
| 2002/0080123 A1 | 6/2002 | Kennedy et al. | 345/173 |
| 2002/0080151 A1 | 6/2002 | Venolia | 345/660 |
| 2002/0097270 A1 | 7/2002 | Keely et al. | |
| 2002/0112180 A1 | 8/2002 | Land et al. | |
| 2002/0180763 A1 | 12/2002 | Kung | 345/660 |
| 2003/0014382 A1 | 1/2003 | Iwamoto et al. | 707/1 |
| 2003/0043113 A1 * | 3/2003 | Itoh | 345/156 |
| 2003/0063073 A1 | 4/2003 | Geaghan et al. | 345/173 |
| 2003/0137522 A1 | 7/2003 | Kaasila et al. | |
| 2004/0021676 A1 | 2/2004 | Chen et al. | |
| 2004/0039934 A1 | 2/2004 | Land et al. | |
| 2004/0075695 A1 | 4/2004 | Chew et al. | |
| 2004/0130575 A1 | 7/2004 | Tai et al. | 345/773 |
| 2004/0135818 A1 | 7/2004 | Thomson et al. | 345/823 |
| 2004/0155888 A1 | 8/2004 | Padgitt et al. | 345/619 |
| 2004/0160419 A1 | 8/2004 | Padgitt | 345/173 |
| 2004/0174399 A1 | 9/2004 | Wu et al. | 345/863 |
| 2004/0183817 A1 | 9/2004 | Kaasila | |
| 2004/0196267 A1 | 10/2004 | Kawai et al. | 345/173 |
| 2004/0203674 A1 | 10/2004 | Shi et al. | 455/415 |
| 2004/0237053 A1 | 11/2004 | Impas et al. | 715/856 |
| 2005/0005241 A1 | 1/2005 | Hunleth et al. | |
| 2005/0012723 A1 | 1/2005 | Pallakoff | |
| 2005/0024341 A1 | 2/2005 | Gillespie et al. | 345/173 |
| 2005/0052547 A1 | 3/2005 | Minakuti et al. | 348/224.1 |
| 2005/0068342 A1 | 3/2005 | Ouchi et al. | 345/684 |
| 2005/0076300 A1 | 4/2005 | Martinez | 715/539 |
| 2005/0093826 A1 | 5/2005 | Huh | 345/168 |
| 2005/0111736 A1 | 5/2005 | Hullender et al. | |
| 2005/0135053 A1 | 6/2005 | Carroll | |
| 2005/0140660 A1 | 6/2005 | Valikangas | 345/173 |
| 2005/0145807 A1 | 7/2005 | Lapstun et al. | |
| 2005/0190059 A1 | 9/2005 | Wehrenberg | |
| 2005/0190147 A1 | 9/2005 | Kim | 345/156 |
| 2005/0192924 A1 | 9/2005 | Drucker et al. | |
| 2005/0198588 A1 | 9/2005 | Lin et al. | |
| 2005/0229117 A1 | 10/2005 | Hullender et al. | |
| 2005/0243373 A1 | 11/2005 | Silverbrook et al. | |
| 2006/0001654 A1 | 1/2006 | Smits | 345/176 |
| 2006/0005151 A1 | 1/2006 | Altman | |
| 2006/0017692 A1 | 1/2006 | Wehrenberg et al. | 345/156 |
| 2006/0022955 A1 | 2/2006 | Kennedy | 345/173 |
| 2006/0022956 A1 | 2/2006 | Lengeling et al. | |
| 2006/0026521 A1 | 2/2006 | Hotelling et al. | 715/702 |
| 2006/0026535 A1 | 2/2006 | Hotelling et al. | 715/863 |
| 2006/0026536 A1 | 2/2006 | Hotelling et al. | 715/863 |
| 2006/0033721 A1 * | 2/2006 | Woolley et al. | 345/173 |
| 2006/0033724 A1 | 2/2006 | Chaudhri et al. | 345/173 |
| 2006/0038796 A1 | 2/2006 | Hinckley et al. | |
| 2006/0041589 A1 | 2/2006 | Helfman et al. | |
| 2006/0053387 A1 | 3/2006 | Ording | 715/773 |
| 2006/0066588 A1 | 3/2006 | Lyon et al. | 345/173 |
| 2006/0085757 A1 | 4/2006 | Andre et al. | 715/771 |
| 2006/0097991 A1 | 5/2006 | Hotelling et al. | 345/173 |
| 2006/0101354 A1 | 5/2006 | Hashimoto et al. | 715/863 |
| 2006/0125803 A1 | 6/2006 | Westerman et al. | 345/173 |
| 2006/0132460 A1 | 6/2006 | Kolmykov-Zotov et al. | 345/173 |
| 2006/0161871 A1 | 7/2006 | Hotelling et al. | |
| 2006/0190833 A1 | 8/2006 | SanGiovanni et al. | |
| 2006/0197753 A1 | 9/2006 | Hotelling | 345/173 |
| 2006/0238519 A1 | 10/2006 | Westerman et al. | 345/173 |
| 2006/0242607 A1 | 10/2006 | Hudson | 715/863 |
| 2006/0244735 A1 * | 11/2006 | Wilson | 345/173 |
| 2006/0265648 A1 | 11/2006 | Rainisto et al. | |
| 2006/0265653 A1 | 11/2006 | Paasonen et al. | |
| 2006/0274051 A1 | 12/2006 | Longe et al. | 345/173 |
| 2006/0277481 A1 | 12/2006 | Forstall et al. | |
| 2006/0284858 A1 | 12/2006 | Rekimoto | 345/173 |
| 2006/0290678 A1 | 12/2006 | Lii | 345/173 |
| 2007/0033544 A1 | 2/2007 | Fleisher et al. | |
| 2007/0055945 A1 | 3/2007 | Weber et al. | |
| 2007/0109275 A1 | 5/2007 | Chuang | |
| 2007/0115264 A1 | 5/2007 | Yu et al. | 345/173 |
| 2007/0139374 A1 | 6/2007 | Harley | 345/157 |
| 2007/0150829 A1 | 6/2007 | Eschbach et al. | |
| 2007/0150842 A1 | 6/2007 | Chaudhri et al. | 715/863 |
| 2007/0152978 A1 | 7/2007 | Kocienda et al. | 345/173 |
| 2007/0152980 A1 | 7/2007 | Kocienda et al. | 345/173 |
| 2007/0152984 A1 | 7/2007 | Ording et al. | 345/173 |
| 2007/0157085 A1 | 7/2007 | Peters | |
| 2007/0186158 A1 | 8/2007 | Kim et al. | |
| 2007/0238489 A1 | 10/2007 | Scott | |
| 2007/0247435 A1 | 10/2007 | Benko et al. | 345/173 |
| 2007/0250793 A1 | 10/2007 | Miura et al. | |
| 2007/0252821 A1 | 11/2007 | Hollemans et al. | |
| 2007/0257890 A1 | 11/2007 | Hotelling et al. | 345/173 |
| 2007/0260981 A1 | 11/2007 | Kim et al. | |
| 2007/0268317 A1 | 11/2007 | Banay | |
| 2008/0002888 A1 | 1/2008 | Yuan | 382/187 |
| 2008/0036743 A1 | 2/2008 | Westerman et al. | 345/173 |
| 2008/0042984 A1 | 2/2008 | Lim et al. | |
| 2008/0055269 A1 | 3/2008 | Lemay et al. | |
| 2008/0055273 A1 | 3/2008 | Forstall | |
| 2008/0062202 A1 | 3/2008 | Schulz et al. | |
| 2008/0077880 A1 | 3/2008 | Oygard | |
| 2008/0082317 A1 | 4/2008 | Rosart et al. | |
| 2008/0094368 A1 | 4/2008 | Ording et al. | 345/173 |
| 2008/0098331 A1 | 4/2008 | Novick et al. | |
| 2008/0122796 A1 * | 5/2008 | Jobs | G06F 3/0488 345/173 |
| 2008/0126387 A1 | 5/2008 | Blinnikka | 707/102 |
| 2008/0165141 A1 | 7/2008 | Christie | |
| 2008/0165142 A1 * | 7/2008 | Kocienda | G06F 3/04886 345/173 |
| 2008/0165143 A1 | 7/2008 | Tolmasky et al. | |
| 2008/0165148 A1 | 7/2008 | Williamson et al. | |
| 2008/0165160 A1 | 7/2008 | Kocienda et al. | 345/175 |
| 2008/0168349 A1 * | 7/2008 | Lamiraux | G06F 3/0482 715/702 |
| 2008/0168388 A1 | 7/2008 | Decker | |
| 2008/0174570 A1 * | 7/2008 | Jobs | G06F 3/0488 345/173 |
| 2008/0180408 A1 * | 7/2008 | Forstall | G06F 3/0482 345/177 |
| 2008/0184138 A1 | 7/2008 | Krzanowski et al. | |
| 2008/0201452 A1 | 8/2008 | Athas et al. | |
| 2008/0252662 A1 | 10/2008 | Hyatt | |
| 2008/0259040 A1 * | 10/2008 | Ording | G06F 3/0488 345/173 |
| 2008/0270891 A1 | 10/2008 | Friedman et al. | |
| 2008/0294974 A1 | 11/2008 | Nurmi et al. | |
| 2008/0316183 A1 | 12/2008 | Westerman et al. | |
| 2008/0316212 A1 | 12/2008 | Kushler | |
| 2008/0320391 A1 | 12/2008 | Lemay et al. | |
| 2009/0002326 A1 | 1/2009 | Pihlaja | |

(56) References Cited

U.S. PATENT DOCUMENTS

| | | |
|---|---|---|
| 2009/0005011 A1* | 1/2009 | Christie ............... G06Q 10/107 455/412.2 |
| 2009/0006991 A1 | 1/2009 | Lindberg et al. |
| 2009/0015596 A1 | 1/2009 | Fuchs et al. |
| 2009/0044124 A1 | 2/2009 | Pihlaja |
| 2009/0048000 A1 | 2/2009 | Ade-Hall |
| 2009/0070704 A1 | 3/2009 | Ording |
| 2009/0073194 A1 | 3/2009 | Ording |
| 2009/0077488 A1 | 3/2009 | Ording |
| 2009/0089707 A1 | 4/2009 | Knowles |
| 2009/0093276 A1 | 4/2009 | Kim et al. |
| 2009/0125848 A1 | 5/2009 | Keohane et al. |
| 2009/0138810 A1 | 5/2009 | Howard et al. |
| 2009/0153492 A1 | 6/2009 | Popp |
| 2009/0167700 A1 | 7/2009 | Westerman et al. .......... 345/173 |
| 2009/0177981 A1* | 7/2009 | Christie ............. G06F 3/04883 715/758 |
| 2009/0178008 A1 | 7/2009 | Herz et al. |
| 2009/0225100 A1 | 9/2009 | Lee et al. ....................... 345/660 |
| 2009/0228792 A1 | 9/2009 | van Os et al. ................ 715/702 |
| 2009/0228828 A1 | 9/2009 | Beatty et al. |
| 2009/0228841 A1 | 9/2009 | Hildreth ........................ 715/863 |
| 2009/0228842 A1 | 9/2009 | Westerman et al. |
| 2009/0235186 A1 | 9/2009 | Howard et al. |
| 2009/0292989 A1 | 11/2009 | Matthews et al. |
| 2009/0319888 A1 | 12/2009 | Oygard |
| 2010/0042933 A1 | 2/2010 | Ragusa |
| 2010/0123737 A1 | 5/2010 | Williamson et al. |
| 2010/0169766 A1 | 7/2010 | Duarte et al. |
| 2010/0174732 A1 | 7/2010 | Levy et al. |
| 2010/0174979 A1 | 7/2010 | Mansfield et al. |
| 2010/0174980 A1 | 7/2010 | Mansfield et al. |
| 2010/0174985 A1 | 7/2010 | Levy et al. |
| 2010/0185975 A1 | 7/2010 | Anwar |
| 2010/0202010 A1 | 8/2010 | Xiao |
| 2010/0231529 A1 | 9/2010 | Tikka |
| 2010/0235726 A1* | 9/2010 | Ording .................. G06F 1/1626 715/234 |
| 2010/0235729 A1* | 9/2010 | Kocienda ............ G06F 1/1626 715/255 |
| 2010/0235734 A1 | 9/2010 | Ording et al. |
| 2010/0235783 A1 | 9/2010 | Ording et al. |
| 2010/0235793 A1* | 9/2010 | Ording .................. G06F 1/1626 715/863 |
| 2010/0274674 A1 | 10/2010 | Roberts et al. |
| 2010/0283743 A1 | 11/2010 | Coddington |
| 2011/0007094 A1 | 1/2011 | Nash et al. |
| 2011/0074698 A1 | 3/2011 | Rapp et al. |
| 2011/0074699 A1 | 3/2011 | Marr et al. |
| 2011/0078597 A1 | 3/2011 | Rapp et al. |
| 2011/0258537 A1 | 10/2011 | Rives et al. |
| 2011/0258563 A1 | 10/2011 | Lincke |
| 2011/0267355 A1 | 11/2011 | Coombes et al. |
| 2011/0292084 A1 | 12/2011 | Thomas |
| 2012/0162119 A1* | 6/2012 | Forstall ................. G06F 3/0482 345/173 |
| 2012/0216139 A1* | 8/2012 | Ording .................. G06F 3/0488 715/773 |
| 2012/0274597 A1* | 11/2012 | Forstall ................. G06F 3/0482 345/173 |
| 2013/0055150 A1 | 2/2013 | Galor |
| 2013/0145310 A1* | 6/2013 | Forstall ................. G06F 3/0482 715/784 |
| 2013/0152013 A1* | 6/2013 | Forstall ................. G06F 3/0482 715/784 |
| 2013/0174081 A1 | 7/2013 | Yoon et al. |
| 2013/0241827 A1* | 9/2013 | Ronkainen ........... G06F 3/0488 345/157 |
| 2014/0125609 A1* | 5/2014 | Kocienda ............ G06F 3/04886 345/173 |
| 2014/0139431 A1 | 5/2014 | Tseng et al. |
| 2014/0317549 A1 | 10/2014 | Hwang et al. |
| 2014/0327629 A1* | 11/2014 | Jobs ....................... G06F 3/0488 345/173 |
| 2015/0149955 A1* | 5/2015 | Kocienda ............ G06F 3/04886 715/781 |

FOREIGN PATENT DOCUMENTS

| | | | |
|---|---|---|---|
| CN | 101063920 A | 10/2007 | |
| CN | 101068411 A | 11/2007 | |
| EP | 0 283 995 A2 | 9/1988 | ............. G06F 3/023 |
| EP | 0 476 972 A2 | 3/1992 | ............. G03G 15/00 |
| EP | 0 575 146 A2 | 12/1993 | ............. G06F 3/033 |
| EP | 0 609 030 A1 | 8/1994 | ............. G06F 3/033 |
| EP | 0 651 543 A2 | 5/1995 | ............. H04M 1/00 |
| EP | 0667567 A2 | 8/1995 | |
| EP | 0 795 811 A1 | 9/1997 | ............. G06F 3/033 |
| EP | 1 674 976 A2 | 6/2006 | ............. G06F 3/00 |
| EP | 1 850 217 A2 | 10/2007 | ............. G06F 3/048 |
| EP | 2138929 A2 | 12/2009 | |
| EP | 2144149 A2 | 1/2010 | |
| FR | 2 898 197 A1 | 9/2007 | ............. G06F 3/033 |
| GB | 2 351 639 A | 1/2001 | ............. G06F 3/033 |
| GB | 2 433 402 A | 6/2007 | ............. G06F 3/033 |
| JP | 57-041731 | 3/1982 | ............. G06F 3/033 |
| JP | 59-057336 | 4/1984 | ............. G06F 3/037 |
| JP | 02153415 A | 6/1990 | ............. G06F 3/02 |
| JP | 03113578 A | 5/1991 | ............. G06F 15/62 |
| JP | 04 047358 | 2/1992 | |
| JP | 05 165459 | 7/1993 | ............. G09G 5/36 |
| JP | 6274586 A | 9/1994 | ............. G06F 17/21 |
| JP | 6332617 A | 12/1994 | ............. G06F 3/02 |
| JP | 07320051 | 12/1995 | ............. G06T 3/40 |
| JP | 07320079 | 12/1995 | ............. G06T 11/80 |
| JP | 8185265 A | 7/1996 | ............. G06F 3/033 |
| JP | 8227341 A | 9/1996 | ............. G06F 3/033 |
| JP | 10-340075 A | 12/1998 | |
| JP | 2000 163031 | 6/2000 | ............. G09G 5/00 |
| JP | 2002 342033 | 11/2002 | ............. G06F 3/033 |
| JP | 2007 072233 | 3/2007 | |
| JP | 2007 299394 | 11/2007 | |
| JP | 2010 146279 | 7/2010 | |
| KR | 10-2007-0107462 A | 11/2007 | |
| KR | 10-2010-0039253 A | 4/2010 | |
| WO | WO 94/29788 A1 | 12/1994 | ............. G06F 3/033 |
| WO | WO 98/09270 A1 | 3/1998 | ............. G09G 5/00 |
| WO | WO 98/52118 A | 11/1998 | |
| WO | WO 99/21084 A1 | 4/1999 | |
| WO | WO 99/54807 A1 | 10/1999 | |
| WO | WO 00/75766 A1 | 12/2000 | ............. G06F 3/033 |
| WO | WO 01/46790 A2 | 6/2001 | ............. G06F 3/00 |
| WO | WO 03/023593 A1 | 3/2003 | ............. G06F 3/033 |
| WO | 2004-051430 A2 | 6/2004 | |
| WO | WO 2004/051392 A2 | 6/2004 | |
| WO | WO 2004/070604 A2 | 8/2004 | ............. G06F 3/033 |
| WO | WO 2006/003591 A2 | 1/2006 | ............. G06F 3/033 |
| WO | WO 2006/020304 A2 | 2/2006 | |
| WO | WO 2006/020305 A2 | 2/2006 | |
| WO | 2006/036607 A1 | 4/2006 | |
| WO | WO 2006/126055 A2 | 11/2006 | |
| WO | WO 2007/037806 A1 | 4/2007 | ............. G06F 3/038 |
| WO | 2008/030976 A2 | 3/2008 | |
| WO | WO 2008/030879 A2 | 3/2008 | |
| WO | WO 2008/052100 A2 | 5/2008 | ............. G06F 3/048 |
| WO | 2009/022243 A1 | 2/2009 | |
| WO | WO 2009/085779 A1 | 7/2009 | ............. G06F 3/048 |
| WO | WO 2009/111249 A2 | 9/2009 | ............. G06F 3/048 |

OTHER PUBLICATIONS

Beringer et al., "Operator Behavioral Biases Using High-Resolution Touch Input Devices," Proceedings of the Human Factors Society 33rd Annual Meeting, 1989, 3 pages.

Beringer, D., Target Size, Location, Sampling Point and Instructional Set: More Effects on Touch Panel Operation, Proceedings of the Human Factors Society 34th Annual Meeting, 1990, 5 pages.

Bier, et al., "Toolglass and Magic Lenses: The See-Through Interface," Proceedings of SIGGRAPH '93, ACM 1993, 18 pages.

(56) References Cited

OTHER PUBLICATIONS

Brown et al., "Browsing Graphs Using a Fisheye View," INTERCHI '93, Apr. 24-29, 1993, ACM 1993, 1 page.
Card et al., "Readings in Information Visualization Using Vision to Think," Morgan Kaufman Publishers, Inc., 1999, 711 pages.
Degani et al., "'Soft' Controls for Hard Displays: Still a Challenge," Proceedings of the Human Factors Society 36th Annual Meeting, 1992, 5 pages.
Furnas et al., "Space-Scale Diagrams: Understanding Multiscale Interfaces," CHI '95 Proceedings of the SIGCHI conference on Human factors in computing systems, ACM Press/Addison-Wesley Publishing Co. New York, NY, USA, 1995, 12 pages.
IBM, "Simon Says 'Here's How!'" Simon Users Manual, IBM Corp 1994, 63 pages.
Johnson, J., "A Comparison of User Interfaces for Panning on a Touch-Controlled Display," CHI '95 Proceedings, ACM 1995, 18 pages.
Lamping et al., "Laying out and Visualizing Large Trees Using a Hyperbolic Space," Proceedings of the 7th Annual ACM Symposium on User Interface Software and Technology, Nov. 2-4, 1994, ACM New York, NY, USA, 1994, 2 pages.
Leahy et al., "Effect of Touch Screen Target Location on User Accuracy," Proceeding of the Human Factors Society 34th Annual Meeting, 1990, 5 pages.
Mackinlay et al., "The Perspective Wall: Detail and Context Smoothly Integrated," Proceedings of CHI '91 ACM Conference on Human Factors in Computing Systems, ACM 1991, 7 pages.
Milner, N., "A Review of Human Performance and Preferences with Different Input Devices to Computer Systems," Proceedings of the 4th Conference of the British Computer Society on People and Computers, Cambridge University Press, 1988, 22 pages.
Phillipps, B., "Touchscreens are changing the face of computers," Electronic Products 1994, 7 pages.
Pickering, J., "Touch-sensitive screens: the technologies and their application," Int. J. Man-Machine Studies (1986), 21 pages.
Plaisant et al., "Touchscreen Interfaces for Alphanumeric Data Entry," Proceedings of the Human Factors Society 36th Annual Meeting, 1992, 5 pages.
Plaisant et all., "Touchscreen Toggle Design," Proceedings of the Conference on Human Factors in Computing Systems, Addison Wesley, US, May 3, 1992, 2 pages.
Potter et al., "An Experimental Evaluation of Three Touch Screen Strategies within a Hypertext Database," International Journal of Human-Computer Interaction 1 (1) 41-52, 1989, 12 pages.
Potter et al., "Improving the Accuracy of Touch Screens: An Experimental Evaluation of Three Strategies," CHI '88 Proceedings of the SIGCHI conference on Human factors in computing systems, ACM New York, NY, USA, 1988, 6 pages.
Rao et al., "Exploring Large Tables with the Table Lens," CHI '95 Mosaic of Creativity, May 7-11, 1995, CHI' Companion 95, Denver, Colorado, USA, 2 pages.
Rao et al., "The Table Lens: Merging Graphical and Symbolic Representations in an Interactive Focus+Context Visualization for Tabular Information," Proceedings of the ACM SIGCHI Conference on Human Factors in Computing Systems, Boston, MA, Apr. 1994, 7 pages.
Ren et al., "Efficient strategies for selecting small targets on pen-based systems: an evaluation experiment for selection strategies and strategy classifications," Proceedings of the IFIP Tc2/TC13 WG2.7/WG13.4 Seventh Working Conference on Engineering for Human-Computer Interaction, Kluver, B.V. Deventer, The Netherlands, 1999, 19 pages.
Ren et al., "Improving Selection Performance on Pen-Based Systems: A Study of Pen-Based Interaction for Selection Tasks," ACM Transactions on Computer-Human Interaction, vol. 7, No. 3, Sep. 2000, 33 pages.
Ren et al., "The Best among Six Strategies for Selecting a Minute Target and the Determination of the Minute Maximum Size of the Targets on a Pen-Based Computer," INTERACT '97 Proceedings of the IFIP TC 13 International Conference on Human-Computer Interaction, Chapman & Hall, Ltd. London, UK, UK, 1997, 8 pages.
Riecken, R., "Adaptive Direct Manipulation," IEEE International Conference Proceedings on Systems, Man, and Cybernetics, 'Decision Aiding for Complex Systems, 1991, 6 pages.
Robertson et al., "Information Visualization Using 3D Interactive Animation," Communications of the ACM, Apr. 1993, vol. 36, No. 4, 15 pages.
Schaffer et al., "Navigating Hierarchically Clustered Networks through Fisheye and Full-Zoom Methods," ACM Transactions on Computer-Human Interaction, vol. 3, No. 2, Jun. 1996, 27 pages.
Scott et al., "Designing Touch Screen Numeric Keypads: Effects of Finger Size, Key Size, and Key Spacing," Proceedings of the Human Factors and Ergonomics Society 41st Annual Meeting, 1997, 5 pages.
Sears et al., "High precision touchscreens: design strategies and comparisons with a mouse," Int. J. Man-Machine Studies (1991) 34, 21 pages.
Sears et al., "Investigating touchscreen typing: the effect of keyboard size on typing speed," Behavior & Information Technology, 1993, vol. 12, No. 1, 6 pages.
Shneiderman, B., "Designing the User Interface Strategies for Effective Human-Computer Interaction," Second Edition, Addison-Wesley Publishing Company 1992, 599 pages.
Shneiderman, B., "Designing the User Interface Strategies for Effective Human-Computer Interaction," Third Edition, Addison-Wesley Publishing Company 1998, 669 pages.
Shneiderman, B., "Direct Manipulation for Comprehensible, Predictable and Controllable User Interfaces," IUI '97 Proceedings of the 2nd International Conference on Intelligent User Interfaces, ACM New York, New York, USA 1997, 7 pages.
Shneiderman, B., "The Eyes Have It: A Task by Data Type Taxonomy for Information Visualizations," Proceedings of the 1996 IEEE Symposium on Visual Languages (VL '96), 1996 IEEE, 8 pages.
Shneiderman, B., "Touch Screens Now Offer Compelling Uses," Interface IEEE Software, Mar. 1991, 2 pages.
Smith, R., "Relating Distortion to Performance in Distortion Oriented Displays," Proceedings Sixth Australian Conference on Computer-Human Interaction, 1996, Hamilton, New Zealand, 6 pages.
Sparks of Innovation in Human-Computer Interaction, B. Shneiderman, Ed., Ablex Publ., Norwood, N.J., (1993), various sections, 133 pages.
Stone et al., "The Movable Filter as a User Interface Tool," CHI '94 Proceedings of SIGCHI conference on Human factors in computing systems: celebrating interdependence, ACM New York, NY, USA, 1994, 7 pages.
Ware et al., "The DragMag Image Magnifier," CHI '95 Mosaic of Creativity, May 7-11, 1995, ACM 1995, 2 pages.
Ahlberg, C. et al., "The Alphaslider: A Compact and Rapid Selector," ACM, Apr. 1994, proceedings of the SIGCHI conference on Human Factors in Computing Systems, pp. 365-371.
Ahlberg et al., "Visual Information Seeking: Tight Coupling of Dynamic Query Filters with Starfield Displays," Human Factors in Computing Systems, Boston MA, Apr. 24-28, 1994, 7 pages.
Ahlström et al., "Overcoming Touchscreen User Fatigue by Workplace Design," Proceeding CHI '92 Posters and short talks of the 1992 SIGCHI conference on Human factors in computing systems ACM, New York, 1992, 2 pages.
Baeza-Yates, R., "Visualization of Large Answers in Text Databases," AVI '96 Proceedings of the Working Conference on Advanced Visual Interfaces, ACM, New York, 1996, 7 pages.
Barthel, B., "Information Access for Visually Impaired Persons: Do We Still Keep a 'Document' in 'Documentation'?" Professional Communication Conference, IPCC '95, Sep. 27-29, 1995, 5 pages.
Bederson et al., "Pad++: A Zooming Graphical Interface for Exploring Alternate Interface Physics," UIST "94, 1994 ACM, 10 pages.
Bernabei et al., "Graphical I/O Devices for Medical Users," Engineering in Medicine and Biology Society, 1992 14th Annual International Conference of the IEEE, Oct. 29-Nov. 1, 1992, Paris, France, 3 pages.
Burger, D., "Improved Access to Computers for the Visually Handicapped: New Prospects and Principles," IEEE Transactions on Rehabilitation Engineering, vol. 2, No. 3. Sep. 1994, 8 pages.

(56) References Cited

OTHER PUBLICATIONS

Eslambolchilaar et al., "Making Sense of Fisheye Views," Second Dynamics and Interaction Workshop at University of Glasgow, Glasgow, Scotland, Aug. 2005, 6 pages.
Furnas, G., "Effective View Navigation," CHI '97 Proceedings of the SIGCHI conference on Human factors in computing systems, ACM, New York, 1997, 8 pages.
Furnas, G., "Generalized Fisheye Views," ACM SIGCHI Bulletin, Special Issue:CHI '86 Conference Proceedings, vol. 17, Issue 4, Apr. 1986, 8 pages.
Furnas, G., "The Fisheye Calendar System," Bellcore Technical Memorandum, Nov. 19, 1991, 9 pages.
Greenberg, S., "A Fisheye Text Editor for Relaxed-WYSIWIS Groupware," CHI '96 Companion, Vancouver, BC, Canada, Apr. 13-18, 1996, 2 pages.
Hinckley et al., "A survey of Design Issues in Spatial Input," Proceedings of the ACM Symposium on User Interface Software and Technology, Nov. 2-4, 1994, 10 pages.
Kamba et al., "Using small screen space more efficiently," CHI '96, Vancouver, BC, Canada, Apr. 13-18, 1996, 8 pages.
Keahey et al., "Non-Linear Image Magnification," Department of Computer Science, Indiana University, Apr. 24, 1996, 11 pages.
Keahey et al., "Nonlinear Magnification Fields," Department of Computer Science, Indiana University, Proceedings of the 1997 IEEE Symposium on Information Visualization, 12 pages.
Keahey et al., "Techniques for Non-Linear Magnification Transformations," Proceedings of the 1996 Symposium on Information Visualization, 8 pages.
Keahey et al., "Viewing Text With Non-Linear Magnification: An Experimental Study," Department of Computer Science, Indianan University, Apr. 24, 1996, 9 pages.
Kline et al., "Improving GUI Accessibility for People with Low Vision," Proceedings of the SIGCHI conference on Human factors in computing systems, May 7;-11, 1995, 10 pages.
Kline et al., "UnWindows 1.0: X Windows Tools for Low Vision Users," Newsletter ACM SIGCHI Computers and the Physically Handicapped, Issue 49, Mar. 1994, 5 pages.
Lazzaro, J., "Adapting desktop computers to meet the needs of disabled workers is easier than you might think," Byte Magazine, Jun. 1993, #144, 5 pages.
Lemmons et al., "Hewlett-Packard makes some magic," Product Review, Byte Publications Inc., Oct. 1983, 15 pages.
Leung et al., "A Review and Taxonomy of Distortion-Oriented Presentation Techniques," ACM Transactions on Computer-Human Interaction, vol. 1, No. 2, Jun. 1994, 35 pages.
Lieberman, H., "A Multi-Scale, Multi-Layer, Translucent Virtual Space," First International Conference on Information Visualization (IV'97), London, England, Aug. 27-28, 8 pages.
Lieberman, H., "Powers of Ten Thousand: Navigating in Large Information Spaces," Proceedings of the ACM Symposium on User Interface Software and Technology, Nov. 2-4, 1994, 2 pages.
MacKenzie et al., "Alphanumeric entry on pen-based computers," International Journal of Human-Computer Studies (1994) 41, 18 pages.
NCIP staff, "Magnification Technology," National Center to Improve Practice in Special Education Through Technology, Media, and Materials, 1994, 7 pages, http://www2.edc.org/ncip/library/vi/magnifi.htm.
Noik, G., "Layout-independent Fisheye Views of Nested Graphs," in VL'93: IEEE Symposium on Visual Languages, IEEE 1993, 6 pages.
Robertson et al., "The Document Lens," UIST '93 Proceedings of the 6th annual ACM symposium on User interface software and technology, ACM, NewYork, 1993, 8 pages.
Rosner et al., "In Touch: A Graphical User Interface Development Tool," Software Tools for Interface Design, IEEE Colloquium, London, UK, Nov. 8, 1990, 7 pages.
Sarkar et al., "Graphical Fisheye Views of Graphs," Chi'92, Proceedings of the SIGCHI conference on Human Factors in Computing Science, May 3-7, 1992, ACM N Y, 1992, 9 pages.
Sarkar et al., "Graphical Fisheye Views of Graphs," Mar. 17, 1992, DEC/Systems Research Center 1992, 31 pages.
Sarkar et al., "Graphical Fisheye Views," Communications of the ACM, Dec. 1994, vol. 37, No. 12, 12 pages.
Sarkar et al., "Stretching the Rubber Sheet: A Metaphor for Viewing Large Layouts on Small Screens," Proceedings of the ACM Symposium on User Interface Software and Technology, Nov. 3-5, 1993, 11 pages.
Sheelagh et al., "3-Dimensional Pliable Surfaces: For the Effective Presentation of Visual Information," 1995 User Interface Software & Technology, 11 pages.
Sheelagh et al., "Extending Distortion Viewing from 2D to 3D," IEEE Computer Graphics and Applications, vol. 17, Issue 4, Jul./Aug. 1997, 10 pages.
Sheelagh et al., "Making Distortions Comprehensible," Proceedings of Symposium on Visual Languages, 1997, 10 pages.
Simkovitz, D., "LP-DOS Magnifies the PC Screen," Proceedings of the Johns Hopkins National Search for Computing Applications to Assist Persons with Disabilities, Feb. 1-5, 1992, 2 pages.
Su, J., "A Review of Telesensory's Vista PCI Screen Magnification System," Journal of Visual Impairment & Blindness, Oct. 1998, 5 pages.
Su et al., "A Review of Supernova Screen Magnification Program for Windows," Journal of Visual Impairment & Blindness, Feb. 1999, 3 pages.
Su et al., "A Review of Zoom Text Xtra Screen Magnification Program for Windows 95," Journal of Visual Impairment & Blindness, Feb. 1998, 4 pages.
Uslan et al., "A Review of Henter-Joyce's MAGic for Windows NT," Journal of Visual Impairment and Blindness, Oct. 1999, 3 pages.
Uslan et al., "A Review of Two Screen Magnification Programs for Windows 95: Magnum 95 and LP-Windows," Journal of Visual Impairment & Blindness, Sep.-Oct. 1997, 5 pages.
Vogel et al., "Shift: A Technique for Operating Pen-Based Interfaces Using Touch," CHI 2007, Apr. 28-May 3, 2007, 10 pages.
Apple.com, "Quasi Clipboard," Apple Web Apps, Jan. 7, 2008, 1 page, http://www.apple.com/webapps/utilities/quasiclipboard.html.
Bitstream®, "ThunderHawk Pocket PC Edition for End Users," 2005, 4 pages, http://www.bitstream.com/wireless/products/pocketpc/faq_using.html.
iPhone Hacks, "iCopy Brings Copy & Paste Feature to the iPhone," 2008, 3 pages, http://www.iphonehacks.com/2008/03/iphone-icopy.html.
iPhone Hacks, "iPhone App-MagicPad's Copy & Paste Feature," 2008, 2 pages, http://www.iphonehacks.com/2008/07/iphonecopypaste.html.
Lee et al., "A Multi-Touch Three Dimensional Touch-Sensitive Tablet," CHI 85 Proceedings, Apr. 1985, pp. 21-25.
Lonelysandwich, "iPhone Copy/Paste Proof of Concept Video," Jan. 28, 2008, 1 page, http://babygotmac.com/a/iphone-copypaste-proof-of-concept-video/.
Mac Forums, "How Would You Like Selection/Copy/Paste to Work?" Jul. 17, 2007, 13 pages, http://forums.macrumors.com/showthread.php?p=3932833#post3932833.
Miller, D., "Personal/Java Application Environment," Jun. 8, 1999, http://java.sun.com/products/personaljava/touchable/, 12 pages.
Mitchell, R. "GUI Gets a Makeover," Computerworld Software, 4 pages, Sep. 25, 2006, http://www.computerworld.com/action/article.do?command=printArticleBasic&articleId=263695.
Rekimoto, J. et al., "PreSense: Interaction Techniques for Finger Sensing Input Devices," UIST 2003, Vancouver, BC, Canada, © 2003 ACM, vol. 5, Issue 2, pp. 203-212.
Rubine, D., "Combining Gestures and Direct Manipulation," Conference of Human Factors in Computing Systems, pp. 659-660, 1992.
Rubine, D., "The Automatic Recognition of Gestures," 1991 Dean Harris Rubine, in partial fulfillment of the requirements for the degree of Doctor of Philosophy in Computer Science, Carnegie Mellon University, 285 pages.
Shen et al., "Informing the Design of Direct-Touch Tabletops," IEEE Sep./Oct. 2006, pp. 36-46.
Westerman, W., "Hand Tracking Finger Identification and Chordic Manipulation on a Multi-touch Surface," Copyright © 1999 (Spring) Wayne Westerman, 363 pages.

(56) References Cited

OTHER PUBLICATIONS

YouTube, iPhone Copy and Paste video, http://www.youtube.com/watch?v=UXgsQhiGeag.
International Search Report and Written Opinion dated May 2, 2011, received in International Application No. PCT/US2010/060113, which corresponds to U.S. Appl. No. 12/638,736 (McCullough).
International Search Report and Written Opinion dated Jul. 18, 2008, received in International Application No. PCT/US2007/082486, which corresponds to U.S. Appl. No. 11/923,453 (Kocienda).
International Search Report and Written Opinion dated Jun. 22, 2011, received in International Application No. PCT/US2010/026947, which corresponds to U.S. Appl. No. 12/565,750 (Ording).
Invitation to Pay Additional Fees dated Jun. 9, 2009, received in International Application No. PCT/US009/035177, which corresponds to U.S. Appl. No. 12/042,313 (Westerman).
International Search Report dated Sep. 10, 2009, received in International Application No. PCT/US2009/035177, which corresponds to U.S. Appl. No. 12/042,313 (Westerman).
European Search Report dated Aug. 20, 2009, received in European Application No. 09154312.4, which corresponds to U.S. Appl. No. 12/042,313 (Westerman).
Office Action dated Oct. 30, 2008, received in U.S. Appl. No. 11/553,436 (Ording).
Office Action dated May 13, 2009, received in U.S. Appl. No. 11/553,436 (Ording).
Office Action dated Oct. 30, 2009, received in U.S. Appl. No. 11/553,436 (Ording).
Final Office Action dated Jun. 28, 2010, received in U.S. Appl. No. 11/553,436 (Ording).
Notice of Allowance dated Sep. 29, 2010, received in U.S. Appl. No. 11/553,436 (Ording).
Office Action dated Feb. 9, 2011, received in U.S. Appl. No. 11/923,453 (Kocienda).
Final Office Action dated Oct. 31, 2011, received in U.S. Appl. No. 11/923,453 (Kocienda).
Office Action dated Aug. 10, 2011, received in Chinese Patent Application No. 200780046864.5, which corresponds to U.S. Appl. No. 11/923,453 (Kocienda).
Office Action dated Oct. 15, 2009, received in European Patent Application No. 07 854 411.1, which corresponds to U.S. Appl. No. 11/923,453 (Kocienda).
Office Action dated May 5, 2008, received in U.S. Appl. No. 10/927,925 (Kennedy).
Office Action dated Apr. 16, 2009, received in U.S. Appl. No. 10/927,925 (Kennedy).
Final Office Action dated Nov. 17, 2009, received in U.S. Appl. No. 10/927,925 (Kennedy).
Notice of Allowance dated Mar. 15, 2010, received in U.S. Appl. No. 10/927,925 (Kennedy).
Notice of Allowance dated Jan. 27, 2011, received in U.S. Appl. No. 12/565,750 (Ording).
Notice of Allowance dated Apr. 4, 2011, received in U.S. Appl. No. 12/565,750 (Ording).
Office Action dated Sep. 26, 2011, received in U.S. Appl. No. 12/565,750 (Ording).
Office Action dated Mar. 14, 2011, received in U.S. Appl. No. 12/820,974 (Kennedy).
Final Office Action dated Sep. 1, 2011, received in U.S. Appl. No. 12/820,974 (Kennedy).
Office Action dated Dec. 7, 2010 received in U.S. Appl. No. 12/042,313 (Westerman).
Final Office Action dated Aug. 31, 2011, received in U.S. Appl. No. 12/042,313 (Westerman).
Office Action dated Dec. 31, 2010, received in Chinese Patent Application No. 200910118597.9, which corresponds to U.S. Appl. No. 12/042,313 (Westerman).
Office Action dated Aug. 24, 2011, received in Chinese Patent Application No. 200910118597.9, which corresponds to U.S. Appl. No. 12/042,313 (Westerman).

Kottke et al., "New iPhone features," kottke.org, Jul. 5, 2007, http://web.archive.org/web/20070705203857/http://www.knttke.org/07/07/new-iphone-features, 19 pages.
European Search Report dated May 9, 2012, received in European Patent Application No. 11192108.6, which corresponds to U.S. Appl. No. 12/242,852, 6 pages (van Os).
Notice of Allowance dated Jun. 12, 2013, received in U.S. Appl. No. 11/923,453, 16 pages (Kocienda).
Office Action dated Jul. 25, 2013, received in European Patent Application No. 11 186 455.9, which corresponds to U.S. Appl. No. 11/923,453, 6 pages (Kocienda).
Office Action dated Jun. 3, 2013, received in Japanese Patent Application No. 2012 500841, which corresponds to U.S. Appl. No. 12/565,750, 2 pages (Ording).
Office Action dated Apr. 26, 2013, received in Korean Patent Application No. 10-2011-7024282, which corresponds to U.S. Appl. No. 12/565,750, 2 pages (Ording).
Notice of Allowance dated Jul. 11, 2013, received in U.S. Appl. No. 12/565,752, 16 pages (Ording).
Office Action dated Aug. 5, 2013, received in U.S. Appl. No. 12/565,753, 12 pages (Ording).
Final Office Action dated Dec. 20, 2012, received in U.S. Appl. No. 12/555,754, 24 pages (Ording).
Office Action dated Dec. 27, 2013, received in U.S. Appl. No. 12/565,754, 23 pages (Ording).
Final Office Action dated Jan. 3, 2013, received in U.S. Appl. No. 12/565,755, 18 pages (Kocienda).
Notice of Allowance dated Oct. 15, 2013, received in U.S. Appl. No. 12/565,756, 15 pages (Kocienda).
pages Office Action dated Dec. 20, 2013, received in U.S. Appl. No. 12/565,757, 13 pages (Ording).
Notice of Allowance dated Apr. 8, 2013, recieved in U.S. Appl. No. 12/565,759, 14 pages (Ording).
Notice of Allowance dated Dec. 18, 2012, received in U.S. Appl. No. 12/820,974, 14 pages (Kennedy).
Final Office Action dated Apr. 18, 2013, received in U.S. Appl. No. 12/042,313, 9 pages (Westerman).
Notice of Allowance dated Oct. 2, 2013, received in U.S. Appl. No. 12/042,313, 8 pages (Westerman).
Office Action dated Oct. 8, 2013, received in European Patent Application No. 09 154 312.4, which corresponds to U.S. Appl. No. 12/042,313, 4 pages (Westerman).
Final Office Action dated Aug. 15, 2012, received in U.S. Appl. No. 12/565,753, 11 pages (Ording).
Office Action dated Jul. 26, 2012, received in U.S. Appl. No. 12/565,755, 31 pages (Kocienda).
Final Office Action dated Aug. 15, 2012, received in U.S. Appl. No. 12/565,757; 12 pages (Ording).
Notice of Allowance dated Oct. 2, 2012, received in U.S. Appl. No. 12/565,760, 13 pages (Ording).
Notice of Allowance dated Aug. 3, 2012, received in U.S. Appl. No. 12/20,974, 8 pages (Kennedy).
Office Action dated Sep. 27, 2012, received in U.S. Appl. No. 12/042,313, 26 pages (Westerman).
Brighthand, "Thread: Cut, Copy & Paste," Brighthand.com, Jan. 13, 2005, http://forum.brighthand.com/showthread.php?t=82701, 2 pages.
Brighthand, "Thread: How do I cut & paste, & copy on a PDA." Brighthand.com, Sep. 19, 2004, http://forum.brighthand.com/showthread.php?s=2d32c96c9aaedaa454e3d05962503046&t=77588, 2 pages.
Chen, Y., "Detecting Web Page Structure for Adaptive Viewing on Small Form Factor Devices," Microsoft Research, i-yuchen@microsoft.com, May 20-24, 2003, 9 pages.
FreewarePalm, "CutPaste5 v3.1," FreewarePalm.com, Apr. 6, 2004, http://www.freewarepalm.com/utilities/cutpaste5.shtml, 2 pages.
Holman et al., "PaperWindows:Interaction Techniques for Digital Paper," Papers: Physical Interaction, CHI 2005, Apr. 2-7, 2005, Portland, Oregon, USA, 9 pages.
Jordan, M., "Quick Look in Leopard," Mac Tips, Nov. 7, 2007, 6 pages, http://mactips.info/tips/2007/11/quick-look-in-leopard.

(56) References Cited

OTHER PUBLICATIONS

Raskin, A., "Firefox Mobile Concept Video," Aza'S Thoughts, Jun. 11, 2008, http://www.azarask.in/blog/post/firefox-mobile-concept-vido/, 50 pages.
Starrett, C., "iPhone Gems: Top Photography and Image Manipulation Apps," iLounge, Oct. 8, 2008, 14 pages, http://www.ilounge.com/index.php/articles/comments/iphone-gems-top-photography-and-image-manipulation-apps.
Treo FAQ, "How can I copy and paste text on my Treo?" treocentral.com, downloaded Sep. 4, 2012, http://www.treocentral.com/content/FAQ/110.htm, 1 page.
Vimeo, "iPhone Copy and Paste," lonelysandwich, Sep. 2007, http://www.vimeo.com/266383, 7 pages.
W3C, "Cascading Style Sheets." level 2 revision 1 Css 2.1 Specification, Jun. 13, 2005, 14 pages, http://www.w3.org/TR/2005/WD-CSS21-20050613.
Yatani et al., "Escape: A target Selection Technique Using Visually-cued Gestures," CHI 2008, Apr. 5-10, 2008, Florence, Italy, 10 pages.
YouTube, "Copy/Cut and Paste for iPhone," 3:19 minute video, uploaded to YouTube by madmaxwhatever on Aug. 20, 2008, http://www.youtube.com/watch?v=3-3ZmJL5BCg, 1 page.
YouTube, "Copy and Paste on a Palm Pre," 1:13 minute video uploaded to YouTube by MobileInfocenter on Jan. 9, 2009, http://www.youtube.com/watch?v=luMEMEBiL_g, 2 pages.
YouTube, "eMInd Basic Gestures: Cutting, Copying and Pasting Text," 1:10 minute video uploaded to YouTube by quine42 on Nov. 22, 2008, http://www.youtube.com/watch?v=4QIOYiCcChc, 1 page.
YouTube, "iPhone Cut & Paste with(in) Citrix XenApp," 1:31 minute video uploaded to YouTube by chrisfictxs on Jan. 6, 2009, http://www.youtube.com/watch?v=NJDnQ4DAY3s, 1 page.
European Search Report and Written Opinion dated Mar. 6, 2012, received in European Patent Application No. 11186455.9, which corresponds to U.S. Appl. No. 11/923,453, 9 pages (Kocienda).
International Search Report and Written Opinion dated Nov. 12, 2009, received in International Application No. PCT/US2008/086542, which corresponds to U.S. Appl. No. 12/242,852, 16 pages (van Os).
International Preliminary Report on Patentability dated Sep. 16, 2010, received in International Application No. PCT/US2008/086542, which corresponds to U.S. Appl. No. 12/242,852, 11 pages (van Os).
Decision to Grant dated May 15, 2012, received in Chinese Patent Application No. 200780046864.5, which corresponds to U.S. Appl. No. 11/923,453, 4 pages (Kocienda).
Office Action dated Mar. 18, 2011, received in U.S. Appl. No. 12/242,852, 16 pages (van Os).
Final Office Action dated Sep. 21, 2011, received in U.S. Appl. No. 12/242,852, 6 pages (van Os).
Notice of Allowance dated Jan. 9, 2012, received in U.S. Appl. No. 12/242,852, 10 pages (van Os).
Notice of Allowance dated Apr. 27, 2012, received in U.S. Appl. No. 12/242,852, 25 pages (van Os).
Office Action dated Feb. 14, 2011, received in European Patent Application No. 08 873 123.7, which corresponds to U.S. Appl. No. 12/242,852, 4 pages (van Os).
Intention to Grant dated Sep. 13, 2011, received in European Patent Application No. 08 873 123.7, which corresponds to U.S. Appl. No. 12/242,862, 4 pages (van Os).
Decision to Grant dated Dec. 30, 2012, received in European Patent Application No. 08873123.7, which corresponds to U.S. Appl. No. 12/242,852, 1 page (van Os).
Final Office Action dated Mar. 26, 2012, received in U.S. Appl. No. 12/565,750, 16 pages (Ording).
Notice of Allowance dated Jul. 3, 2012, received in U.S. Appl. No. 12/565,750, 34 pages (Ording).
Office Action dated Mar. 1, 2012, received in U.S. Appl. No. 12/565,751, 36 pages (Ording).
Final Office Action dated Jun. 22, 2012, received in U.S. Appl. No. 12/565,751, 18 pages (Ording).
Office Action dated Jan. 27, 2012, received in U.S. Appl. No. 12/565,752, 33 pages (Ording).
Notice of Allowance dated Jun. 5, 2012 received in U.S. Appl. No. 12/565,752, 7 pages (Ording).
Office Action dated Mar. 13, 2012, received in U.S. Appl. No. 12/565,753, 31 pages (Ording).
Office Action dated Jun. 12, 2012, received in U.S. Appl. No. 12/565,754, 41 pages (Ording).
Office Action dated Feb. 2, 2012, received in U.S. Appl. No. 12/565,756, 31 pages (Kocienda).
Notice of Allowance dated May 31, 2012, received in U.S. Appl. No. 12/565,756, 5 pages (Kocienda).
Office Action dated Mar. 2, 2012, received in U.S. Appl. No. 12/565,757, 31 pages (Ording).
Office Action dated Aug. 2, 2012, received in U.S. Appl. No. 12/565,759, 28 pages (Ording).
Office Action dated Jan. 27, 2012, received in U.S. Appl. No. 12/565,760, 39 pages (Ording).
Notice of Allowance dated Jun. 11, 2012 received in U.S. Appl. No. 12/565,760, 11 pages (Ording).
Office Action dated Dec. 29, 2011, received in U.S. Appl. No. 12/620,974, 26 pages (Kennedy).
Decision to Grant dated Jun. 5, 2012, received in Chinese Patent Application No. 200910118597.9, which corresponds to U.S. Appl. No. 12/042,313, 1 page (Westerman).
Extended European Search Report (includes Partial European Search Report and European Search Opinion) received for European Patent Application No. 12154861.4, mailed on Jun. 2, 2015, 10 pages.
International Search Report and Written Opinion received for PCT Patent Application No. PCT/US08/087045, mailed on Feb. 27, 2009, 13 pages.
International Search Report and Written Opinion received for PCT Patent Application No. PCT/US2007/077645, mailed on Jan. 10, 2008, 7 pages.
International Preliminary Report on Patentability received for PCT Patent Application No. PCT/US2007/082486, issued on Apr. 28, 2009, 7 pages.
International Preliminary Report on Patentability received for PCT Patent Application No. PCT/US2009/035177, issued on Sep. 7, 2010, 11 pages.
International Preliminary Report on Patentability received for PCT Patent Application No. PCT/US2010/026947, mailed on Sep. 29, 2011, 11 pages.
International Preliminary Report on Patentability received for PCT Patent Application No. PCT/US2012/040291, mailed on Dec. 12, 2013, 19 pages.
International Search Report and Written Opinion received for PCT Patent Application No. PCT/US2012/040291, mailed on Jan. 17, 2013, 27 pages.
Invitation to Pay Additional Fees received for PCT Application No. PCT/US2012/040291, mailed on Aug. 30, 2012, PCT/US2012/040291.
Office Action received for Australian Patent Application No. 2012262127, issued on Jan. 27, 2015, 3 pages.
Office Action received for Canadian Patent Application No. 2,755,796, mailed on Oct. 22, 2014, 4 pages.
Decision to Grant received for Chinese Patent Application No. 200880129021.6, mailed on Apr. 12, 2013, 4 pages (Official Copy only). (See Communication under 37 CFR § 1.98(a) (3)).
Office Action received for Chinese Patent Application No. 200880129021.6, mailed on Jun. 4, 2012, 7 pages (4 pages of English Translation & 3 pages of Official Copy).
Office Action received for Chinese Patent Application No. 201210295979.0, mailed on May 5, 2014, 12 pages (6 pages of English Translation and 6 pages of Official copy).
Office Action received for European Patent Application No. 07854411.1, mailed on Apr. 18, 2012, 5 pages.
Office Action received for European Patent Application No. 09154312.4, mailed on Feb. 5, 2010, 1 page.
Partial European Search Report received for European Patent Application No. 09154312.4, mailed on Jun. 3, 2009, 4 pages.
Office Action received for European Patent Application No. 10712823.3, mailed on Nov. 20, 2012, 6 pages.

(56) References Cited

OTHER PUBLICATIONS

Notice of Allowance received for Japanese Patent Application No. 2014-000636, mailed on Feb. 13, 2015, 3 pages (Official Copy only). (See Communication under 37 CFR § 1.98(a) (3)).
Office Action received for Japanese Patent Application No. 2014-513715, mailed on Jan. 16, 2015, 8 pages (5 pages of English Translation and 3 pages of Official Copy).
Notice of Allowance received for Korean Patent Application No. 10-2013-7028483, mailed on Aug. 19, 2014, 3 pages (Official Copy only). (See Communication under 37 CFR § 1.98(a) (3)).
Office Action received for Korean Patent Application No. 10-2013-7032396, mailed on Jan. 21, 2015, 3 pages (Official Copy only). (See Communication under 37 CFR § 1.98(a) (3)).
Final Office Action received for U.S. Appl. No. 10/927,925, mailed on Dec. 20, 2007, 26 pages.
Final Office Action received for U.S. Appl. No. 10/927,925, mailed on Nov. 10, 2008, 22 pages.
Non-Final Office Action received for U.S. Appl. No. 10/927,925, mailed on Jul. 24, 2007, 21 pages.
Final Office Action received for U.S. Appl. No. 12/565,754, mailed on May 22, 2014, 9 pages.
Final Office Action received for U.S. Appl. No. 12/565,757, mailed on Apr. 18, 2014, 11 pages.
Non-Final Office Action received for U.S. Appl. No. 12/565,757, mailed on Sep. 3, 2014, 9 pages.
Final Office Action received for U.S. Appl. No. 13/243,202, mailed on Jul. 17, 2013, 13 pages.
Non Final Office Action received for U.S. Appl. No. 13/243,202, mailed on May 1, 2014, 11 pages.
Non-Final Office Action received for U.S. Appl. No. 13/243,202, mailed on Nov. 9, 2012, 16 pages.
Non-Final Office Action received for U.S. Appl. No. 13/243,423, mailed on May 24, 2013, 11 pages.
Non-Final Office Action received for U.S. Appl. No. 13/243,506, mailed on May 24, 2013, 16 pages.
Final Office Action received for U.S. Appl. No. 13/243,582, mailed on Jul. 5, 2013, 12 pages.
Non-Final Office Action received for U.S. Appl. No. 13/243,582, mailed on Jan. 29, 2015, 15 pages.
Non-Final Office Action received for U.S. Appl. No. 13/243,582, mailed on Mar. 28, 2014, 17 pages.
Non-Final Office Action received for U.S. Appl. No. 13/243,582, mailed on Oct. 25, 2012, 13 pages.
Non-Final Office Action received for U.S. Appl. No. 13/243,637, mailed on Nov. 8, 2012, 8 pages.
Final Office Action received for U.S. Appl. No. 14/056,253, mailed on Sep. 30, 2014, 11 pages.
Non-Final Office Action received for U.S. Appl. No. 14/056,263, mailed on Mar. 12, 2014, 5 pages.
Notice of Allowance received for U.S. Appl. No. 12/565,753, mailed on Jan. 31, 2014, 8 pages.
Notice of Allowance received for U.S. Appl. No. 13/243,202, mailed on Dec. 5, 2014, 5 pages.
Notice of Allowance received for U.S. Appl. No. 13/243,423, mailed on Jan. 8, 2014, 9 pages.
Notice of Allowance received for U.S. Appl. No. 13/243,423, mailed on Sep. 16, 2013, 9 pages.
Notice of Allowance received for U.S. Appl. No. 13/243,506, mailed on Feb. 6, 2014, 8 pages.
Notice of Allowance received for U.S. Appl. No. 13/243,506, mailed on Oct. 18, 2013, 10 pages.
Notice of Allowance received for U.S. Appl. No. 13/243,637, mailed on Dec. 31, 2013, 8 pages.
Notice of Allowance received for U.S. Appl. No. 13/243,637, mailed on Jul. 3, 2013, 12 pages.
Notice of Allowance received for U.S. Appl. No. 14/056,263, mailed on Dec. 15, 2014, 6 pages.
Notice of Allowance received for U.S. Appl. No. 14/056,263, mailed on Oct. 24, 2014, 8 pages.
Microsoft "Touch", available at <http://msdn.microsoft.com/en-us/library/windows/desktop/dn742468.aspx>, retrieved on Aug. 22, 2014, 11 pages.
"Ai Squared Products", Available at <http://www.aisquared.com/Products/index.cfm>, Oct. 25, 2005, 2 pages.
"Ai Squared Products—ZoomText Magnifier", Available at <http://www.aisquared.com/Products/zoomtextmag/index.cfm>, Oct. 26, 2005, 4 pages.
*Apple Inc.* vs. *Samsung Electronics Co. Ltd.* et al., Judgment in Interlocutory proceeding, Case No. 396957/KG ZA 11-730, civil law sector, Aug. 24, 2011, pp. 1-65.
*Apple Inc.* vs. *Samsung Electronics Co. Ltd.*, et al., Samsung's Motion to Supplement Invalidity Contentions, Case No. 11-cv-01846-LHK, filed Jan. 27, 2012 together with Exhibit 6, Jan. 27, 2012, 47 pages.
*Apple Inc.* vs. *Samsung Electronics Co. Ltd.*, et al., Samsung's Patent Local Rule 3-3 and 3-4 Disclosures, Case No. 11-cv-01846-LHK, dated Oct. 7, 2011, together with Exhibits G-1 through G-7 and Exhibit H. Oct. 7, 2011, 287 pages.
HTC Europe Co. Ltd and Apple Inc. Invalidity Claim dated Apr. 5, 2012, together with annexes, 12 pages.
HTC Europe Co. Ltd and Apple Inc. invalidity Claim dated Jul. 29, 2011, together with amended Particulars of Claim and amended Grounds of Invalidity, 22 pages.
"Lunar Screen Magnifier and Lunar Plus Enhanced Screen Magnifier", Available at <http://www.dolphincomputeraccess.com/products/lunar.htm>, Oct. 25, 2005, 6 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Pleading notes Mr B.J. Berghuis van Woortman, in matter of *Apple Inc.* vs *Samsung Electronics*, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
*Samsung Electronics GmbH* vs *Apple Inc.*, "List scrolling and document translation, scaling and rotation on a touch-screen display", Opposition, Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
"Visual Disabilities", Available at <http://depts.stcc.edu/ods/ACCESS/bpvisual.htm>, Oct. 25, 2005, 3 pages.
Apple.com, "Keyboards", Catamount Software, Available at <http://www.apple.com/webapps/utilities/keyboards.html>, Oct. 23, 2007, 1 page.
Leganchuk et al., "Manual and Cognitive Benefits of Two-Handed Input: An Experimental Study", Transactions on Human-Computer Interaction, vol. 5, No. 4, Dec. 1998, 45 pages.
Mackenzie, I. Scott, "Input Devices and Interaction Techniques for Advanced Computing", W. Barfield, & T.A. Furness III (Eds.), Virtual environments and advanced interface design, Oxford University Press, 1995, 24 pages.
Perez, B. "Palm Reader", LexisNexis, South China Morning Post, Nov. 1, 2005, 1 page.
Ritchie, Rene, "App Review + Q&A: MagicPad Brings Rich Text and Cut and Paste to the iPhone", available at <http://www.imore.com/app-review-qa-magicpad-brings-rich-text-and-cut-and-paste-to-the-iphone>, Aug. 5, 2008, 6 pages.
Final Office Action received for U.S. Appl. No. 12/565,757, mailed on Mar. 26, 2015, 12 pages.
Notice of Allowance received for U.S. Appl. No. 13/243,202, mailed on Mar. 17, 2015, 5 pages.
Office Action received for Chinese Patent Application No. 201210295979.0, mailed on Mar. 23, 2015, 13 pages (6 pages of English Translation and 7 pages of Official Copy).

\* cited by examiner

METHOD, SYSTEM, AND GRAPHICAL USER INTERFACE FOR POSITIONING AN INSERTION MARKER IN A TOUCH SCREEN DISPLAY

RELATED APPLICATIONS

This application is a continuation of U.S. application Ser. No. 11/553,436, filed Oct. 26, 2006 now U.S. Pat. No. 7,856,605, entitled "Method, System, and Graphical User Interface for Positioning an Insertion Marker in a Touch Screen Display," which is incorporated herein by reference in its entirety.

TECHNICAL FIELD

The disclosed embodiments relate generally to user interfaces, and more particularly, to a method, system, and user interface for positioning an insertion marker in a touch-sensitive display.

BACKGROUND

As portable electronic devices become more compact, and the amount of information to be processed and stored increases, it has become a significant challenge to design a user interface that allows users to easily interact with the device. This is unfortunate because the user interface is the gateway through which users receive not only content but also responses to user actions or behaviors, including user attempts to access a device's features or tools. Some portable electronic devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user. In addition, as the number of pushbuttons has increased, the proximity of neighboring buttons often makes it difficult for users to activate a desired pushbutton.

Some portable devices now have user interfaces based on a touch-sensitive display (also known as a "touch screen"). The user interacts with a graphical user interface via the touch-sensitive display. The user may operate the interface with a stylus or a digit. Operating a user interface on a touch-sensitive display with a digit (e.g., a finger), however, poses some problems. Because of the relatively small screen sizes on the portable devices, a digit making contact with the touch screen can obscure a sizable portion of the screen and whatever information that is displayed in the obscured portion. Furthermore, operating the interface with a digit may be less precise, because the contact area of a digit with the touch-sensitive display is typically larger than the contact area of a pointed object such as a stylus. This precision problem is particularly acute in text entry applications, where imprecise positioning of the cursor or character insertion marker can make text entry inefficient and frustrate users.

Accordingly, there is need for more efficient ways to position an insertion marker in a touch sensitive display.

SUMMARY

The above deficiencies and other problems associated with user interfaces for portable devices are reduced or eliminated by the disclosed device that includes an insertion marker placement aid.

According to some embodiments, a computer-implemented method includes, at a portable electronic device with a touch screen display, displaying an insertion marker in the touch screen display; detecting a finger contact with the touch screen display; in response to the detected finger contact, displaying an insertion marker placement aid in the touch screen display; detecting movement of the finger contact; and moving the insertion marker and the insertion marker placement aid in accordance with the detected movement of the finger contact.

According to some embodiments, a graphical user interface on a portable electronic device with a touch screen display includes an insertion marker and an insertion marker placement aid, wherein the insertion marker and the insertion marker placement aid move in the touch screen display in accordance with the detected movement of a finger that contacts the touch screen display.

According to some embodiments, a portable electronic device includes a touch screen display, one or more processors, memory, and one or more programs, wherein the one or more programs are stored in the memory and configured to be executed by the one or more processors. The one or more programs include instructions for displaying an insertion marker in the touch screen display; instructions for detecting a finger contact with the touch screen display; instructions for responding to the detected finger contact by displaying an insertion marker placement aid in the touch screen display; instructions for detecting movement of the finger contact; and instructions for moving the insertion marker and the insertion marker placement aid in accordance with the detected movement of the finger contact.

According to some embodiments, a computer-program product includes a computer readable storage medium and a computer program mechanism embedded therein. The computer program mechanism includes instructions which, when executed by a portable electronic device with a touch screen display, cause the device to display an insertion marker in the touch screen display; to detect a finger contact with the touch screen display; in response to the detected finger contact, to display an insertion marker placement aid in the touch screen display; to detect movement of the finger contact; and to move the insertion marker and the insertion marker placement aid in accordance with the detected movement of the finger contact.

According to some embodiments, a portable electronic device with a touch screen display includes means for displaying an insertion marker in the touch screen display; means for detecting a finger contact with the touch screen display; in response to the detected finger contact, means for displaying an insertion marker placement aid in the touch screen display; means for detecting movement of the finger contact; and means for moving the insertion marker and the insertion marker placement aid in accordance with the detected movement of the finger contact.

According to some embodiments, a computer-implemented method includes, at a portable electronic device with a touch screen display, displaying an insertion marker in the touch screen display; detecting a finger contact with the touch screen display; in response to the detected finger contact, modifying the appearance of the insertion marker in the touch screen display; detecting movement of the finger contact; and moving the modified insertion marker in accordance with the detected movement of the finger contact.

According to some embodiments, a graphical user interface on a portable electronic device with a touch screen display includes an insertion marker wherein, in response to detection of a finger contact with the touch screen display, the appearance of the insertion marker is modified and the modified insertion marker is moved in accordance with detected movement of the finger contact.

According to some embodiments, a portable electronic device includes a touch screen display, one or more processors, memory, and at least one program, wherein the at least one program is stored in the memory and configured to be executed by the one or more processors. The at least one program includes instructions for displaying an insertion marker in the touch screen display; instructions for detecting a finger contact with the touch screen display; instructions for, in response to the detected finger contact, modifying the appearance of the insertion marker in the touch screen display; instructions for detecting movement of the finger contact; and instructions for moving the modified insertion marker in accordance with the detected movement of the finger contact.

According to some embodiments, a computer-program product includes a computer readable storage medium and a computer program mechanism embedded therein. The computer program mechanism includes instructions which, when executed by a portable electronic device with a touch screen display, cause the device to display an insertion marker in the touch screen display; detect a finger contact with the touch screen display; in response to the detected finger contact, modify the appearance of the insertion marker in the touch screen display; detect movement of the finger contact; and move the modified insertion marker in accordance with the detected movement of the finger contact.

According to some embodiments, a portable electronic device with a touch screen display includes means for displaying an insertion marker in the touch screen display; means for detecting a finger contact with the touch screen display; in response to the detected finger contact, means for modifying the appearance of the insertion marker in the touch screen display; means for detecting movement of the finger contact; and means for moving the modified insertion marker in accordance with the detected movement of the finger contact.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
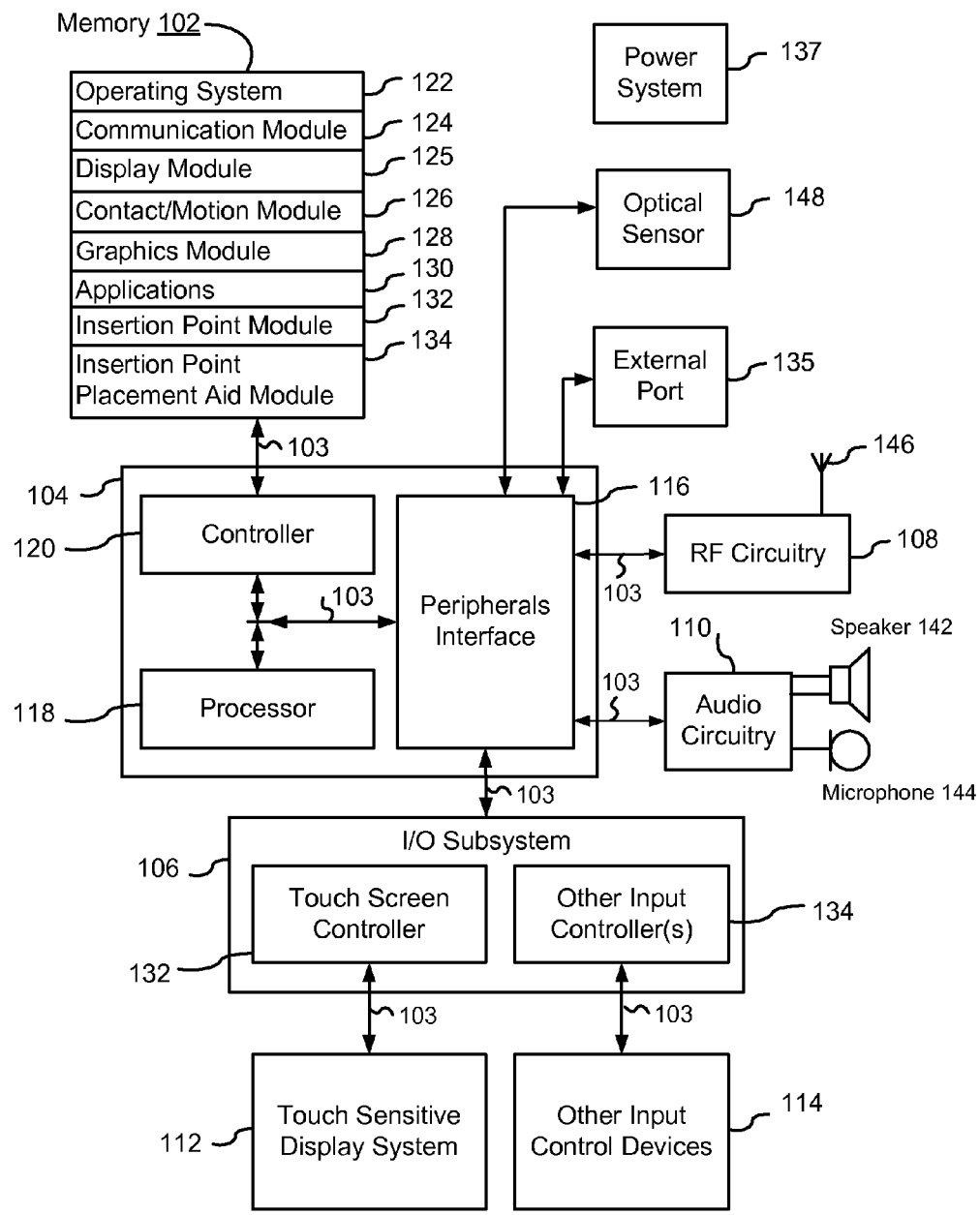
FIG. 1 is a block diagram illustrating a portable electronic device in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of user interfaces and associated processes for using a portable electronic device are described. In some embodiments, the device is a portable communications device such as a mobile telephone. The user interface may include a click wheel in addition to a touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel. For simplicity, in the discussion that follows, a portable communications device (e.g., a cellular telephone that may also contain other functions, such as SMS, PDA and/or music player functions) that includes a touch screen is used as an exemplary embodiment. It should be understood, however, that the user interfaces and associated processes may be applied to other devices, such as personal computers and laptops, which may include one or more other physical user-interface devices, such as a click wheel, a keyboard, a mouse and/or a joystick.

The various applications that may be executed on the device may use at least one common physical user-interface device, such as the touch screen. In embodiments that include a click wheel, one or more functions of the click wheel as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more keyboard embodiments. The keyboard embodiments may include standard (QWERTY) and/or non-standard configurations of symbols on the displayed icons of the keyboard. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the keyboard embodiments.

Attention is now directed to an embodiment of a portable electronic device. FIG. 1 is a block diagram illustrating an embodiment of a portable electronic device 100 having a touch-sensitive display 112. The touch-sensitive display 112 is sometimes called a "touch screen" for convenience. The device 100 may include a memory controller 120, one or more data processors, image processors and/or central processing units 118 and a peripherals interface 116. The memory controller 120, the one or more processors 118 and/or the peripherals interface 116 may be separate components or may be integrated, such as in one or more integrated circuits 104. The various components in the device 100 may be coupled by one or more communication buses or signal lines 103.

If the device 110 includes picture taking capabilities, the peripherals interface 116 is coupled to an optical sensor 148, such as a CMOS or CCD image sensor. The peripherals interface 116 is also coupled RF circuitry 108; audio circuitry 110; and/or an input/output (I/O) subsystem 106. The audio circuitry 110 may be coupled to a speaker 142 and a microphone 144. The device 100 may support voice recognition and/or voice replication. The RF circuitry 108 may be coupled to one or more antennas 146 and may allow communication with one or more additional devices, computers and/or servers using a wireless network. The device 100 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), Bluetooth, Wi-MAX, a protocol for email, instant messaging, and/or a short message service (SMS), or any other suitable communication protocol, including communication protocols not yet developed as of the filing date of this document. In an exemplary embodiment, the device 100 may be, at least in part, a mobile phone (e.g., a cellular telephone).

The I/O subsystem 106 includes a touch screen controller 132 and/or other input controller(s) 134. The touch-screen controller 132 is coupled to a touch-sensitive screen or touch sensitive display system 112. The touch screen 112 and touch screen controller 132 may detect contact and any movement or break thereof using any of a plurality of touch sensitivity technologies now known or later developed, including but not limited to capacitive, resistive, infrared, and surface acoustic wave technologies, as well as other proximity sensor arrays or other elements for determining one or more points of contact with the touch-sensitive screen 112. The touch-sensitive screen 112 may have a resolution in excess of 100 dpi. In an exemplary embodiment, the touch-sensitive screen 112 has a resolution of approximately 168 dpi. The other input controller(s) 134 may be coupled to other input/control devices 114, such as one or more buttons. In some alternate embodiments, input controller(s) 134 may be coupled to any (or none) of the following: a keyboard, infrared port, USB port, and/or a pointer device such as a mouse. The one or more buttons (not shown) may include an up/down button for volume control of the speaker 142 and/or the microphone 144. The one or more buttons (not shown) may include a push button. A quick press of the push button (not shown) may disengage a lock of the touch screen 112. A longer press of the push button (not shown) may turn power to the device 100 on or off. The user may be able to customize a functionality of one or more of the buttons. The touch screen 112 is used to implement virtual or soft buttons and/or one or more keyboards.

In some embodiments, the device 100 may include circuitry for supporting a location determining capability, such as that provided by the Global Positioning System (GPS). In some embodiments, the device 100 may be used to play back recorded music, such as one or more files, such as MP3 files or AAC files. In some embodiments, the device 100 may include the functionality of an MP3 player, such as an iPod (trademark of Apple Computer, Inc.). In some embodiments, the device 100 may include a multi-pin (e.g., 30-pin) connector that is compatible with the iPod.

The device 100 also includes a power system 137 for powering the various components. The power system 137 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The device 100 may also include one or more external ports 135 for connecting the device 100 to other devices.

Memory controller 120 may be coupled to memory 102 with one or more types of computer readable medium. Memory 102 may include high-speed random access memory and/or non-volatile memory, such as one or more magnetic disk storage devices, one or more optical storage devices, and/or flash memory. Memory 102 may store an operating system 122, such as Darwin, RTXC, LINUX, UNIX, OS X, WINDOWS, or an embedded operating system such as VxWorks. The operating system 122 may include procedures (or sets of instructions) for handling basic system services and for performing hardware dependent tasks. Memory 102 may also store communication procedures (or sets of instructions) in a communication module 124. The communication procedures may be used for communicating with one or more additional devices, one or more computers and/or one or more servers. The memory 102 may include a display module (or a set of instructions) 125, a contact/motion module (or a set of instructions) 126 to determine one or more points of contact and/or their movement, and a graphics module (or a set of instructions) 128. The graphics module 128 may support "widgets," that is, modules or applications with embedded graphics. The widgets may be implemented using JavaScript, HTML, Adobe Flash, or other suitable computer program languages.

Memory 102 may also include one or more applications 130. Examples of applications that may be stored in memory 102 include email applications, text messaging or instant messaging applications, web browsers, memo pad applications, address books or contact lists, calendars, picture taking and management applications, and music playing and management applications.

Also in memory 102 are an insertion marker module (or set of instructions) 132 and an insertion marker placement aid module (or set of instructions) 134. The insertion marker module and insertion marker placement aid module includes instructions for controlling various aspects, such as movement, display style, and so forth, of the insertion marker and the insertion marker placement aid, respectively. An insertion marker is a visual object that is displayed on the touch screen to indicate the location where a character entered by the user will be inserted. The insertion marker may also be described as a cursor, insertion point, insertion bar, or pointer. As used in the specification and claims, the insertion marker placement aid is a visual object, separate from the insertion marker, that helps provides visual feedback to the user with regard to control and position of an insertion marker in response to contact(s) with the touch screen by the user's finger. Further details regarding the insertion marker and the insertion marker placement aid are described below.

Each of the above identified modules and applications correspond to a set of instructions for performing one or more functions described above. These modules (i.e., sets of instructions) need not be implemented as separate software programs, procedures or modules. The various modules and sub-modules may be rearranged and/or combined. Memory 102 may include additional modules and/or sub-modules, or fewer modules and/or sub-modules. Memory 102, therefore, may include a subset or a superset of the above identified modules and/or sub-modules. Various functions of the device 100 may be implemented in hardware and/or in software, including in one or more signal processing and/or application specific integrated circuits.

Figure 2:
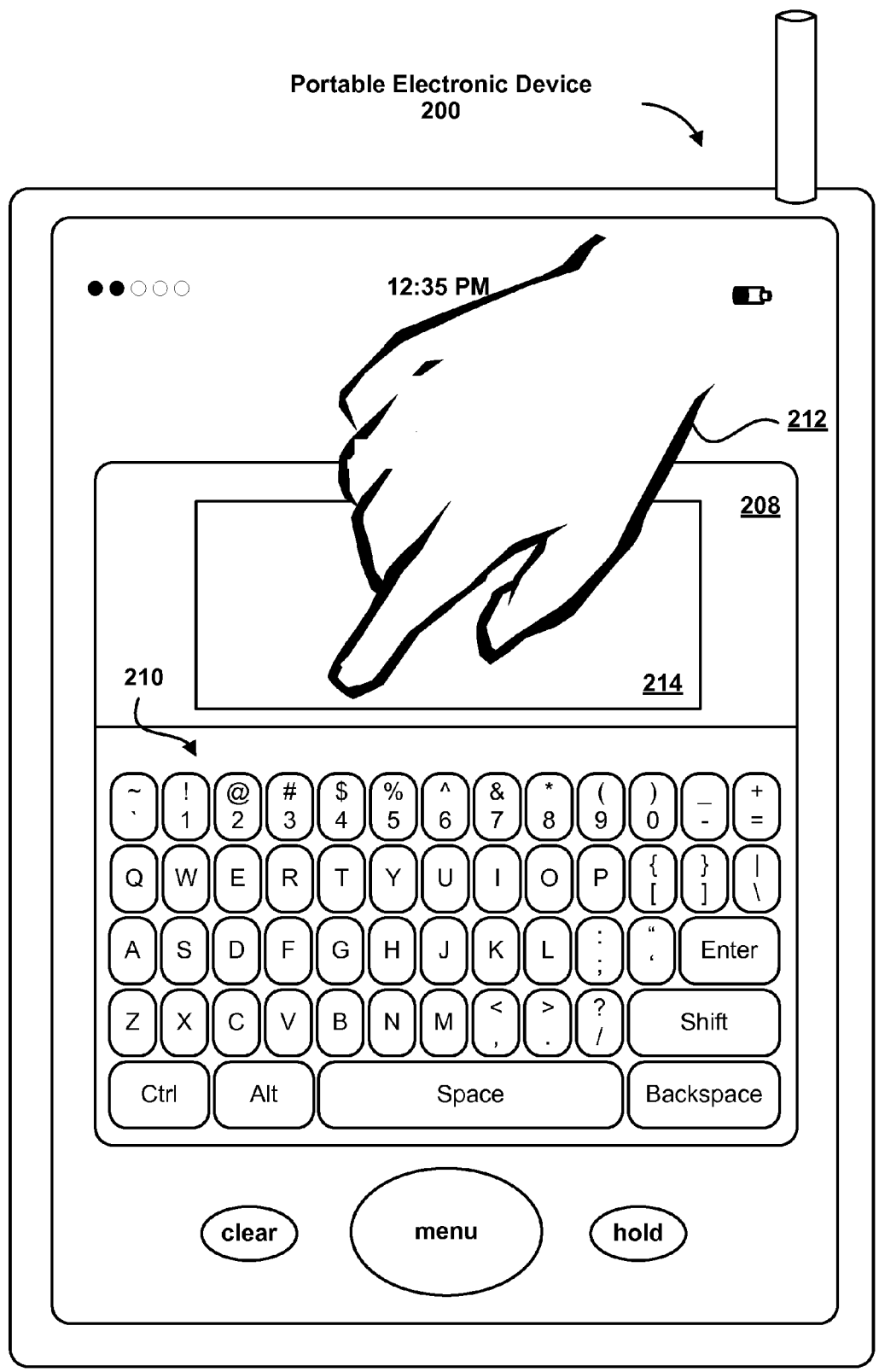
FIG. 2 illustrates a portable electronic device having a touch screen and a soft keyboard in accordance with some embodiments.

Attention is now directed towards embodiments of user interfaces and associated processes that may be implemented on the device 100. FIG. 2 is a schematic diagram illustrating an embodiment of a user interface for a portable electronic device 200. The device 200 includes a touch screen 208. The touch screen may display one or more trays. A tray is a predefined region within a graphical user interface. One tray may include a user entry interface, such as a keyboard 210 that includes a plurality of icons. The icons may include one or more symbols. In this embodiment, as well as others described below, a user may select one or more of the icons, and thus, one or more of the corresponding symbols, by making contact or touching the keyboard 210, for example, with one or more fingers 212 (not drawn to scale in the figure). The contact may correspond to the one or more icons. In some embodiments, selection of an icon occurs when the user breaks contact with the icon. In some embodiments, the contact may include a gesture, such as one or more taps, one or more swipes (from left to right, right to left, upward and/or downward) and/or a rolling of a finger (from right to left, left to right, upward and/or downward) that has made contact with the device 200. In some embodiments, inadvertent contact with an icon may not select a corresponding symbol. For example, a swipe gesture with an icon may not select a corresponding symbol when the gesture corresponding to selection is a tap.

The device 200 may include a display tray 214. The display tray 214 may display one or more of the characters and/or symbols that are selected by the user. The device 200 may also include one or more physical buttons, such as the clear, hold and menu buttons shown in FIG. The menu button may be used to navigate to any application in a set of applications that may be executed on the device 200. Alternatively, in some embodiments, the clear, hold, and/or menu buttons are implemented as soft keys in a GUI in touch screen 208.

Figure 3:
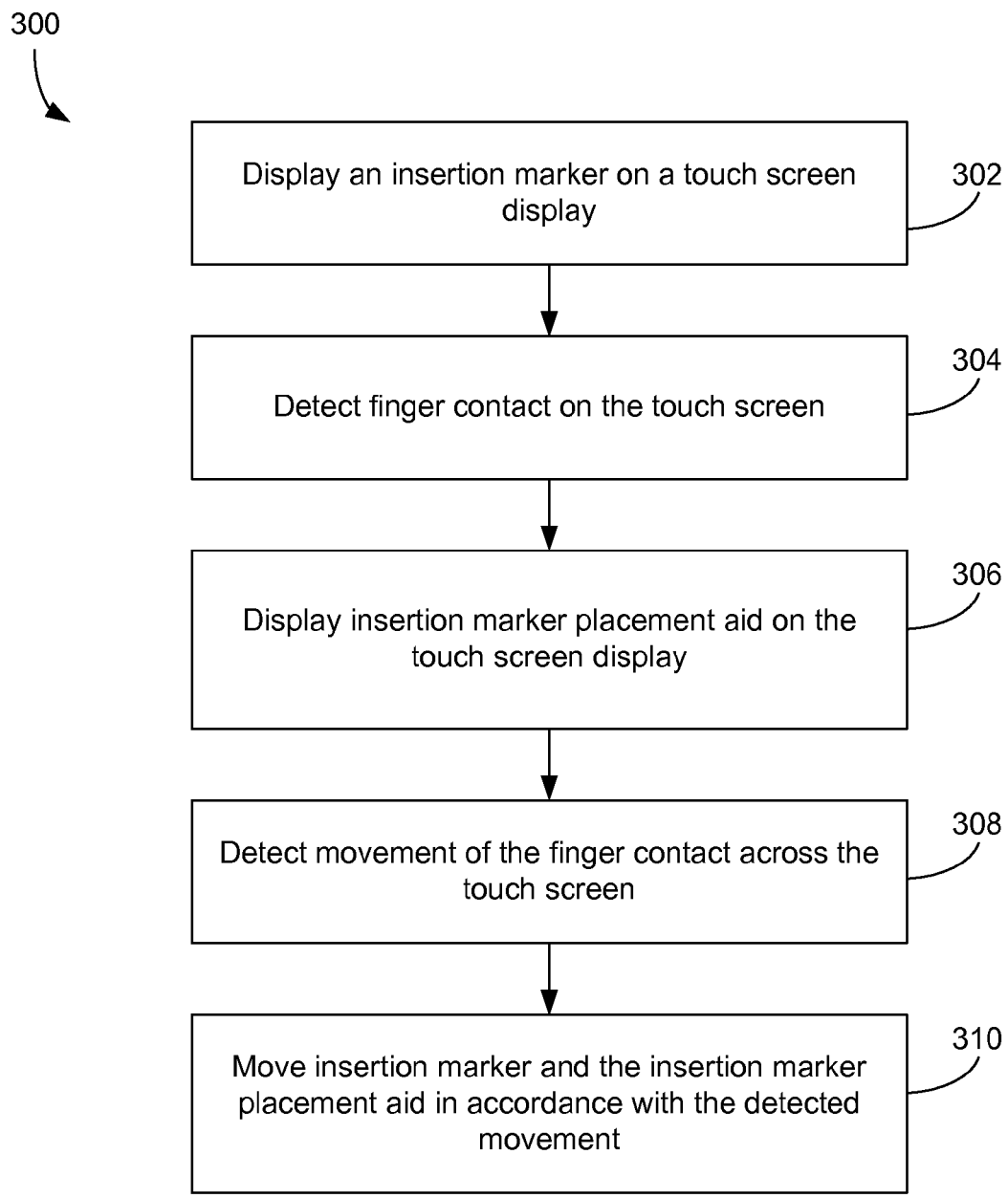
FIG. 3 is a flow diagram illustrating a process for positioning an insertion marker via an insertion marker placement aid in accordance with some embodiments.

Attention is now directed toward FIG. 3, which illustrates a process flow 300 for positioning an insertion marker via an insertion marker placement aid in accordance with some embodiments. An insertion marker is displayed on a touch screen (302). The insertion marker may be displayed in an application that includes text entry, such as a memo pad, email, or short message service (SMS) application. In some embodiments, the insertion marker is displayed in a first area (for example, display tray 214) that also includes text entered by the user via a keyboard (for example, keyboard 210) that is located in a second area. A contact on the touch screen, formed by a finger, is detected (304). The finger contact forms a contact area on the touch screen. In some embodiments, the contact area is not visually displayed to the user. An insertion marker placement aid is displayed on the touch screen (306). In some embodiments, the insertion marker placement aid is not displayed if the detected finger contact is initially in the display area containing the keyboard 210; such contact is interpreted as an attempt to hit a key on the keyboard 210 rather than an attempt to position the insertion marker. In some embodiments, the insertion marker placement aid is displayed if the detected finger contact is initially in an inputted text area (for example, display tray 214), even if the same finger contact is later in the display area containing the keyboard 210; such contact is interpreted as an attempt to position the insertion marker along the bottom of the inputted text area.

A movement of the finger across the touch screen is detected (308). In response to the detected movement, the insertion marker and the insertion marker placement aid is moved in accordance with the detected movement (310). Both the insertion marker and the insertion marker placement aid are moved in the general direction of the detected movement. For example, if the detected movement is rightward, the insertion marker and the insertion marker placement aid are moved rightward. In some embodiments, the movement of the insertion marker and the insertion marker placement aid is confined to the first area, where user-entered text is displayed. That first area may be the display tray 214.

The insertion marker and the insertion marker placement aid moves in accordance with any movement of the finger across the touch screen as long as the finger contact on the touch screen remains unbroken from when the finger contact on the touch screen is detected in block 304. If the contact with the touch screen is broken (and thus the contact with the touch screen is no longer detected), the insertion marker placement aid is removed from display and the insertion marker remains at its last position. In some embodiments, the insertion marker placement aid is removed from display after a predetermined time (e.g., a time in the range 0.25-5.0 seconds) has elapsed after the finger contact is broken and during which contact is not reestablished. Additionally, in some embodiments, when the insertion marker placement aid is removed from display, the insertion marker placement aid is faded out.

Attention is now directed toward FIGS. 4A-4F, which illustrate a user interface for positioning an insertion marker via an insertion marker placement aid in accordance with some embodiments. Text 401 entered by the user may be displayed in the display tray 214. The text 401 may be entered by the user using the keyboard 210. An insertion marker 402 may be displayed in the display tray 214 to indicate the location where the next entered character will be inserted. In some embodiments, the insertion marker 402 is a vertical bar. In some other embodiments, the insertion marker 402 is a rectangular block, an underscore, a vertical bar with two crossbars at the top and bottom (an "I-bar" or "I-beam"), crosshairs, or a pointer arrow. The insertion marker 402 may be displayed with or without a blinking effect.

When a user of the device 200 makes contact with the touch screen with a finger 212 (not shown), the contact forms a contact area 404 (not drawn to scale) on the touch screen 208. As long as the contact with the touch screen 208 remains unbroken, the contact area 404 remains. It should be appreciated, however, that while the contact area 404 is illustrated as a regular shape in the Figures, that is not necessarily so. The contact area 404 may be a regular or irregular shape. Additionally, the shape of the contact area 404 may vary throughout the duration of the contact.

When the contact is detected, an insertion marker placement aid 406 is displayed in the display tray 214. The insertion marker placement aid 406 provides visual feedback to the user that the insertion marker 402 may be repositioned by the user. The insertion marker placement aid 406 also provides visual feedback to the user with respect to the current position of the insertion marker 402. This visual feedback facilitates movement of the insertion pointer by the user without the user placing his finger directly over the insertion marker 402, thereby allowing the user to see the insertion marker as it is moved to a position of the user's choosing.

Figure 4A:
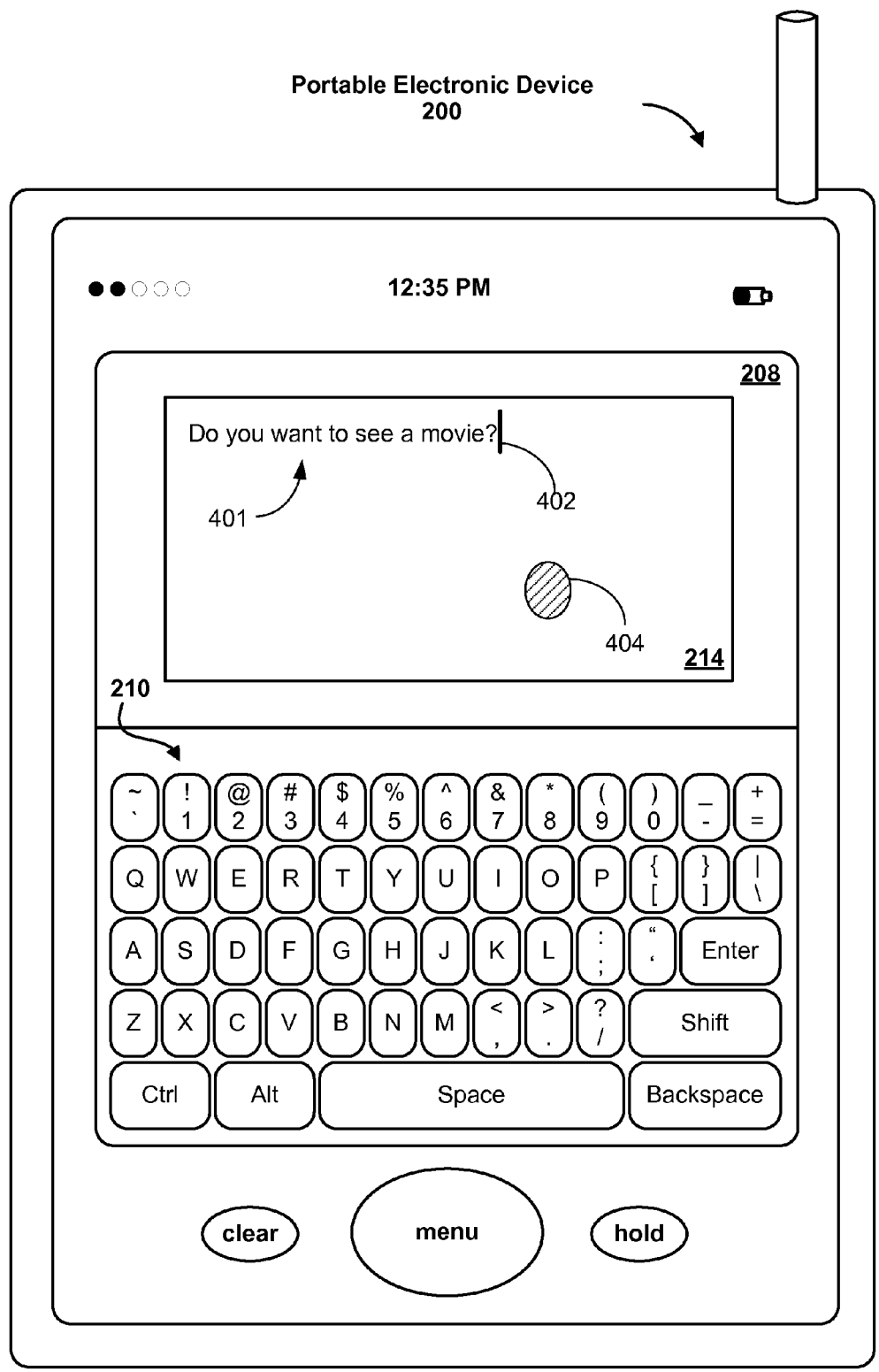
FIGS. 4A-4F illustrate a user interface for positioning an insertion marker via an insertion marker placement aid in accordance with some embodiments.
Figure 4B:
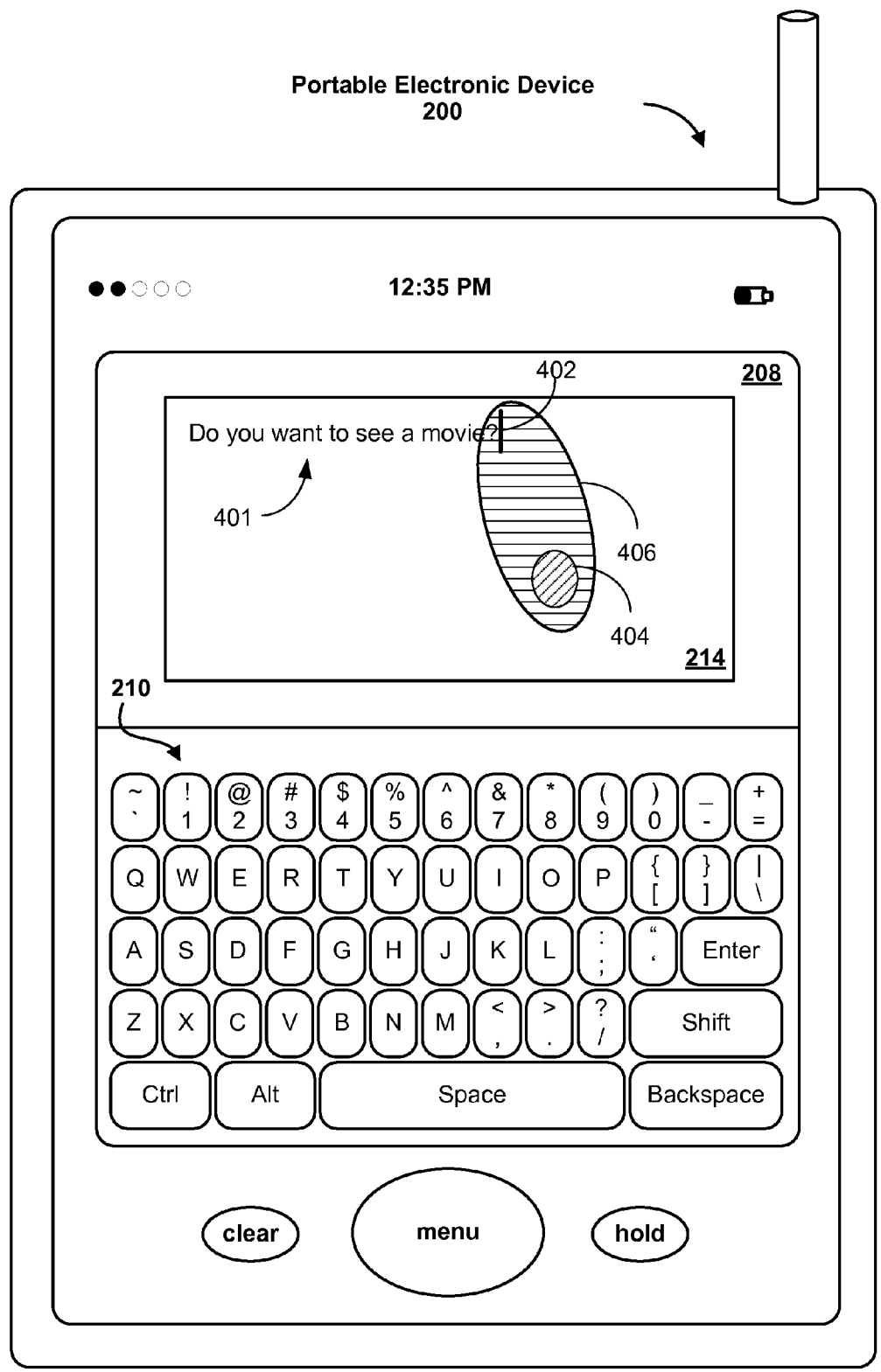
Figure 4C:
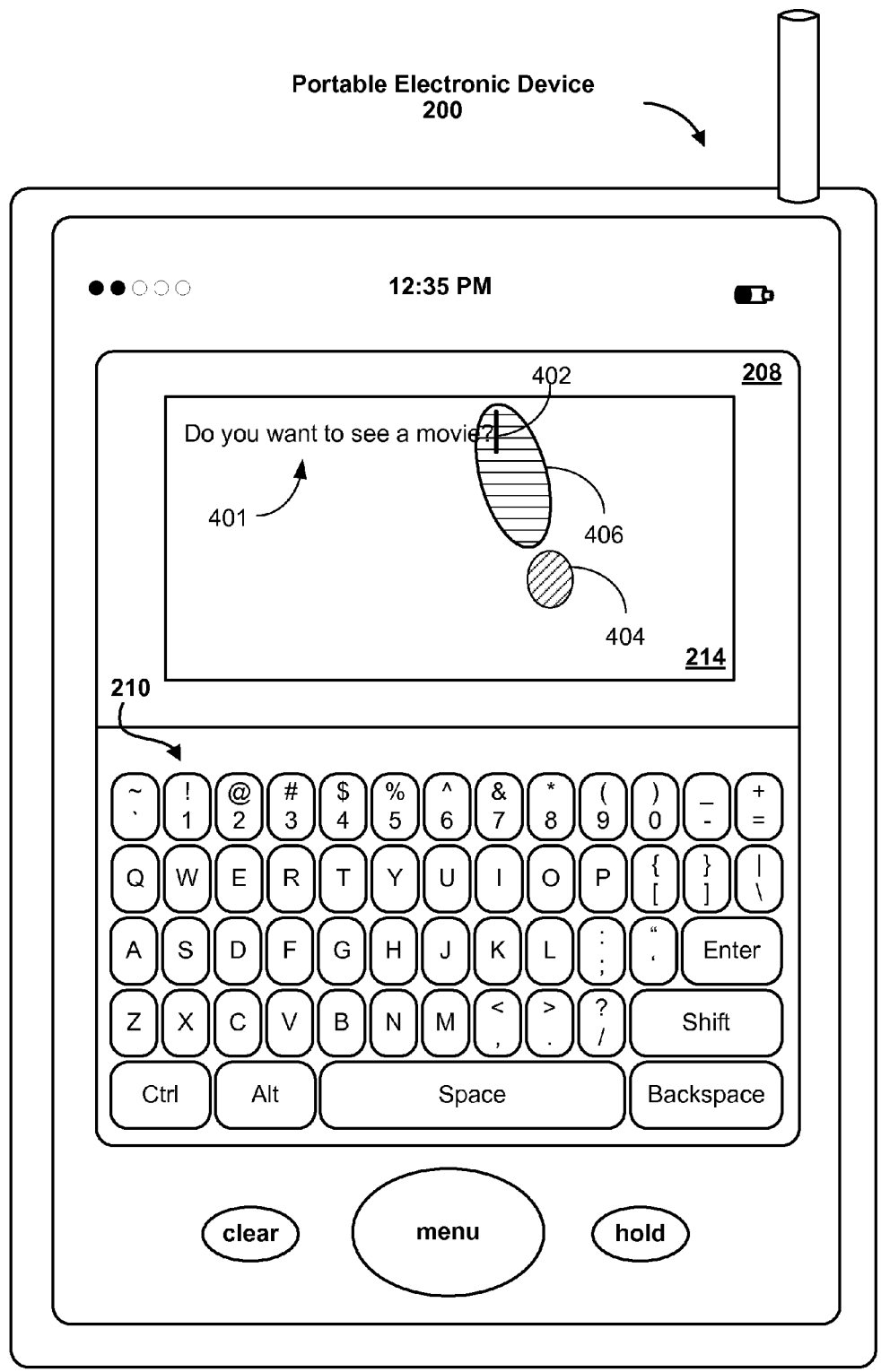
Figure 4D:
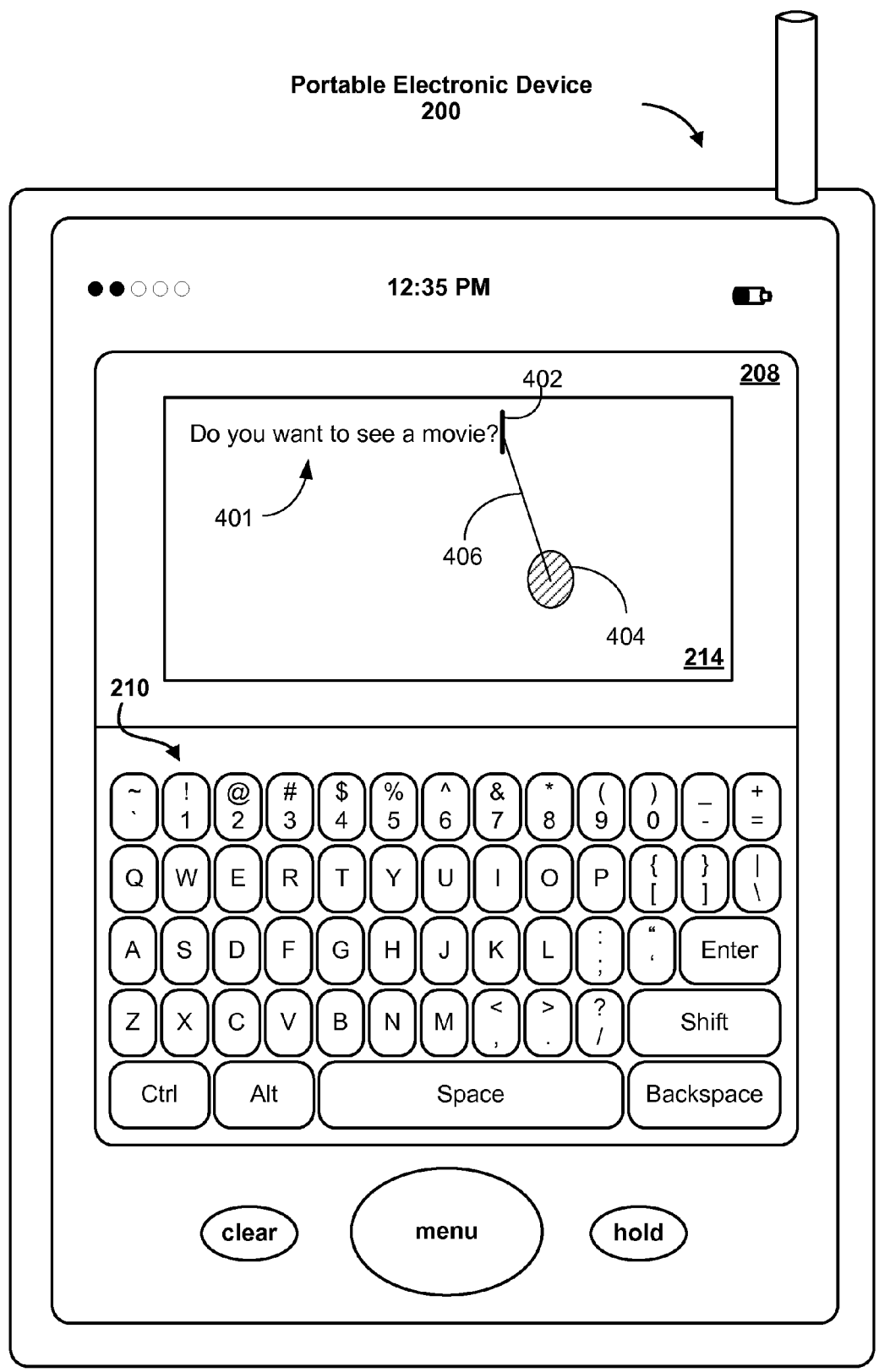
Figure 4E:
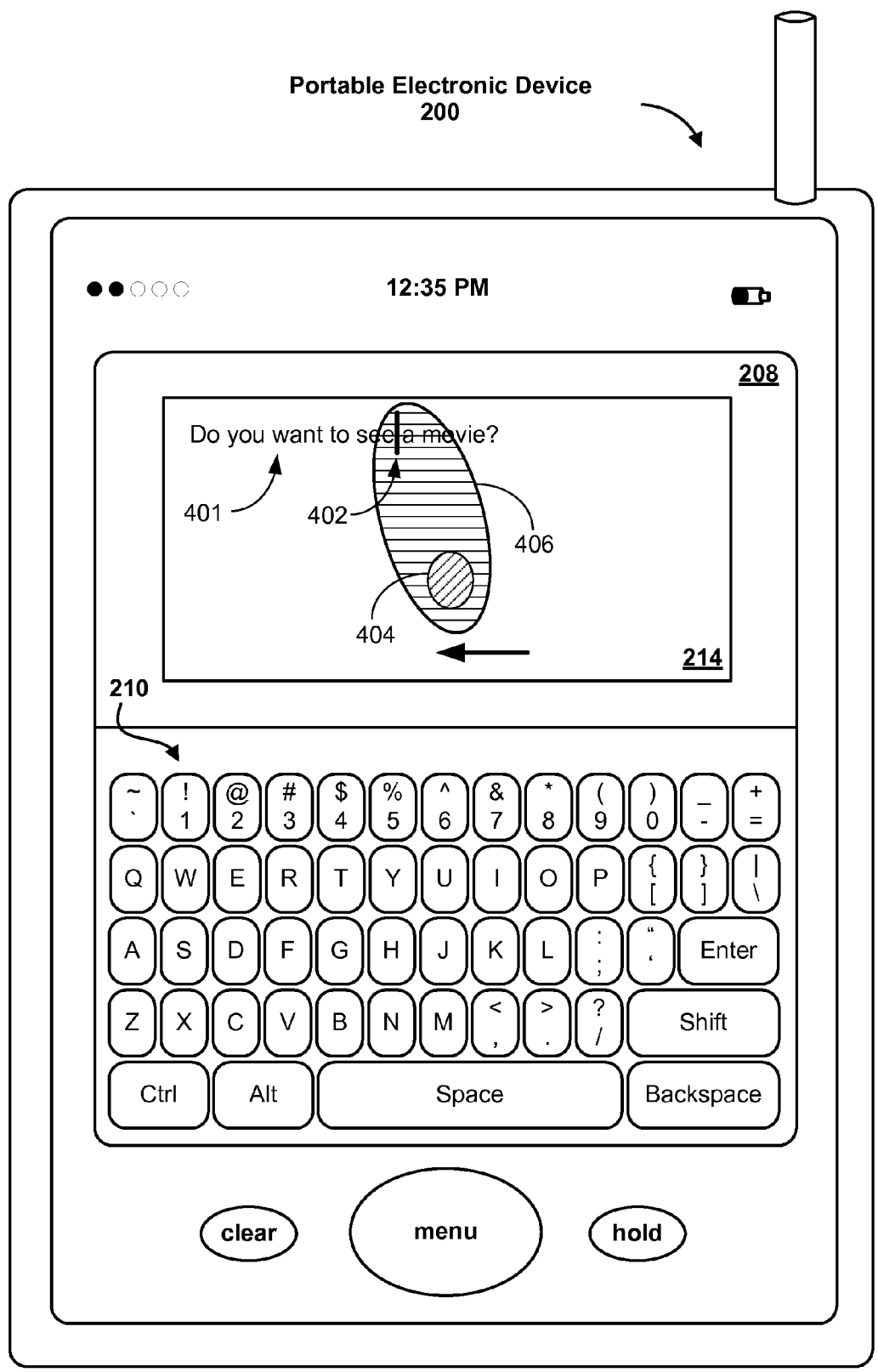

In some embodiments, the insertion marker placement aid 406 is an oval-shaped or some other bounded area that is displayed with a different color, shading and/or brightness (as indicated by the hatching in the interior area of the insertion marker placement aid 406, as shown in FIGS. 4B, 4C, and 4E) than the background of the display tray 214. In some other embodiments, the insertion marker placement aid 406 may be some other shape or object, such as a line connecting the insertion marker 402 and the contact area 404.

In some embodiments, the insertion marker placement aid 406 overlaps both the insertion marker 402 and the contact area 404, as shown in FIGS. 4B, 4D, 4E. In some other embodiments, the insertion marker placement aid 406 need not overlap either the insertion marker 402 or the contact area 404. For example, the insertion marker placement aid 406 may overlap either the insertion marker 402 or the contact area 404 but not both, as shown in FIG. 4C. More generally, the insertion marker placement aid may "overlap" the insertion marker and/or the contact area by intersecting or completely enclosing the insertion marker and/or the contact area, respectively. While in some embodiments the contact area 404 is visually displayed to the user, in other embodiments the contact area 404 is not visually displayed to the user. However, even when it is not explicitly or separately displayed, the contact area 404 is tracked by the device and is used to control the position and movement of the insertion marker 402 and the insertion marker placement aid 406.

Figure 4F:
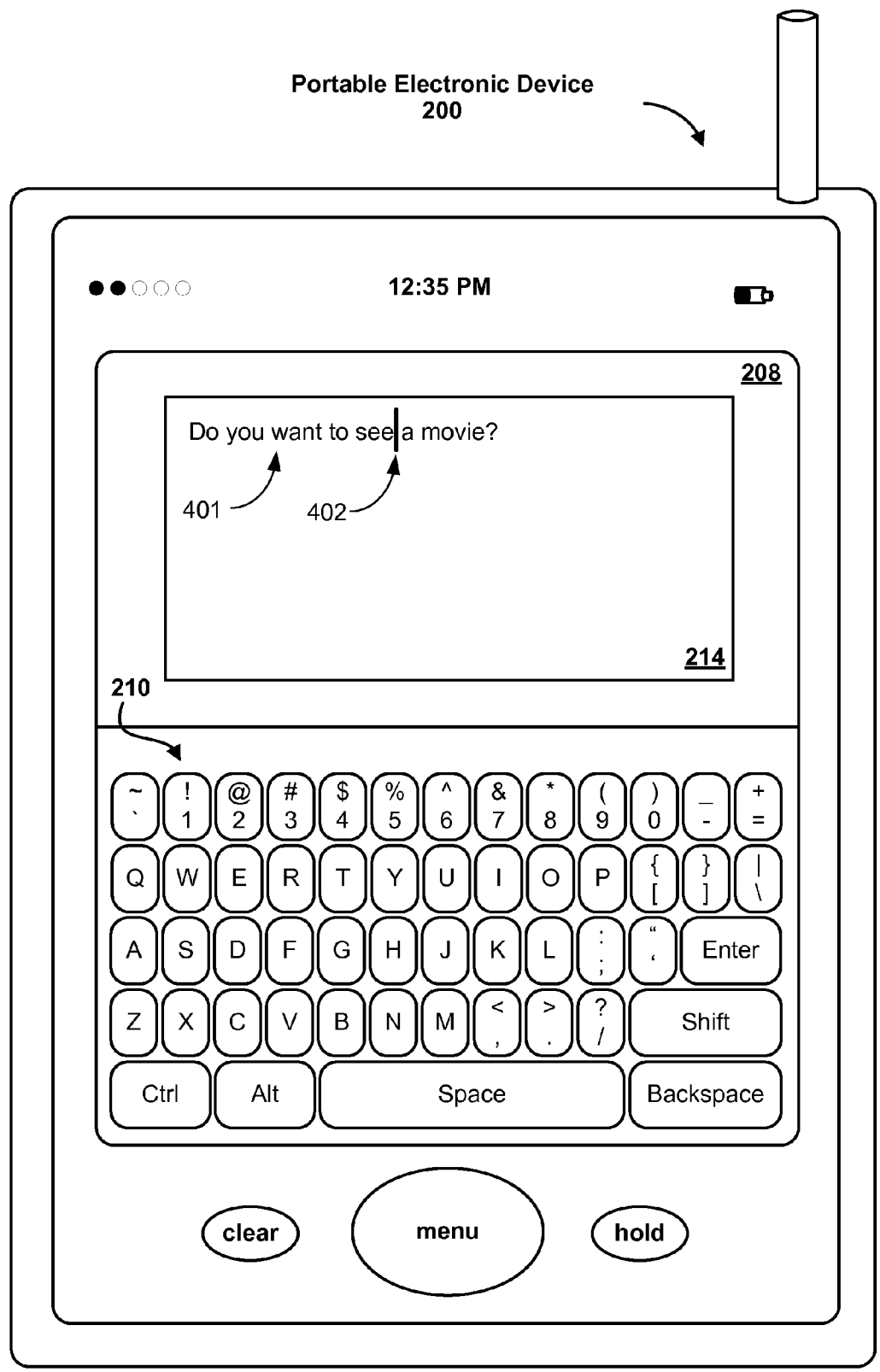

While the finger 212 is still in contact with the touch screen 208, the user may move the finger 212 across the touch screen 208, and thus moving the contact area 404 in the process. As shown in FIG. 4E, the insertion marker placement aid 406 and the insertion marker 402 move along with the contact area 404. The insertion marker 402, which was at the end of the text 401, is now at a position that is closer to the middle of the text 401. When the user removes the contact by lifting the finger 212 away from the touch screen 404, the contact area 404 and the insertion marker placement aid 406 is removed from display, and the insertion marker 402 comes to rest at its last position, as shown in FIG. 4F.

The embodiments described above enable a user of a portable device to easily move and position an insertion marker displayed on the touch screen without the aid of a precision instrument (such as a stylus). The user can make contact with the touch screen with a finger, away from the location of the insertion marker, without obscuring the insertion marker or content in the immediate vicinity of the insertion marker. An insertion marker placement aid is displayed to indicate to the user that the insertion marker is under the user's control and may be repositioned by the user. The user moves the finger contact, and the insertion marker and the insertion marker placement aid moves in accordance with the movement of the finger contact. Once the insertion marker is in the user's desired position, the user breaks the finger contact and the insertion marker is left in the desired position. In some instances, finger movements associated with breaking contact with the display result in a cursor position not intended by the user. To avoid this unintended result, in some embodiments, heuristic rules are used to determine the position of the insertion marker after the user breaks the finger contact. For example, the final position of the cursor may be made in accordance with the average location of the user's finger during a predetermined time interval just before contact with the display was broken. Alternatively, the final position of the cursor may ignore finger movements in a predetermined time interval before contact with the display was broken.

Figure 5A:
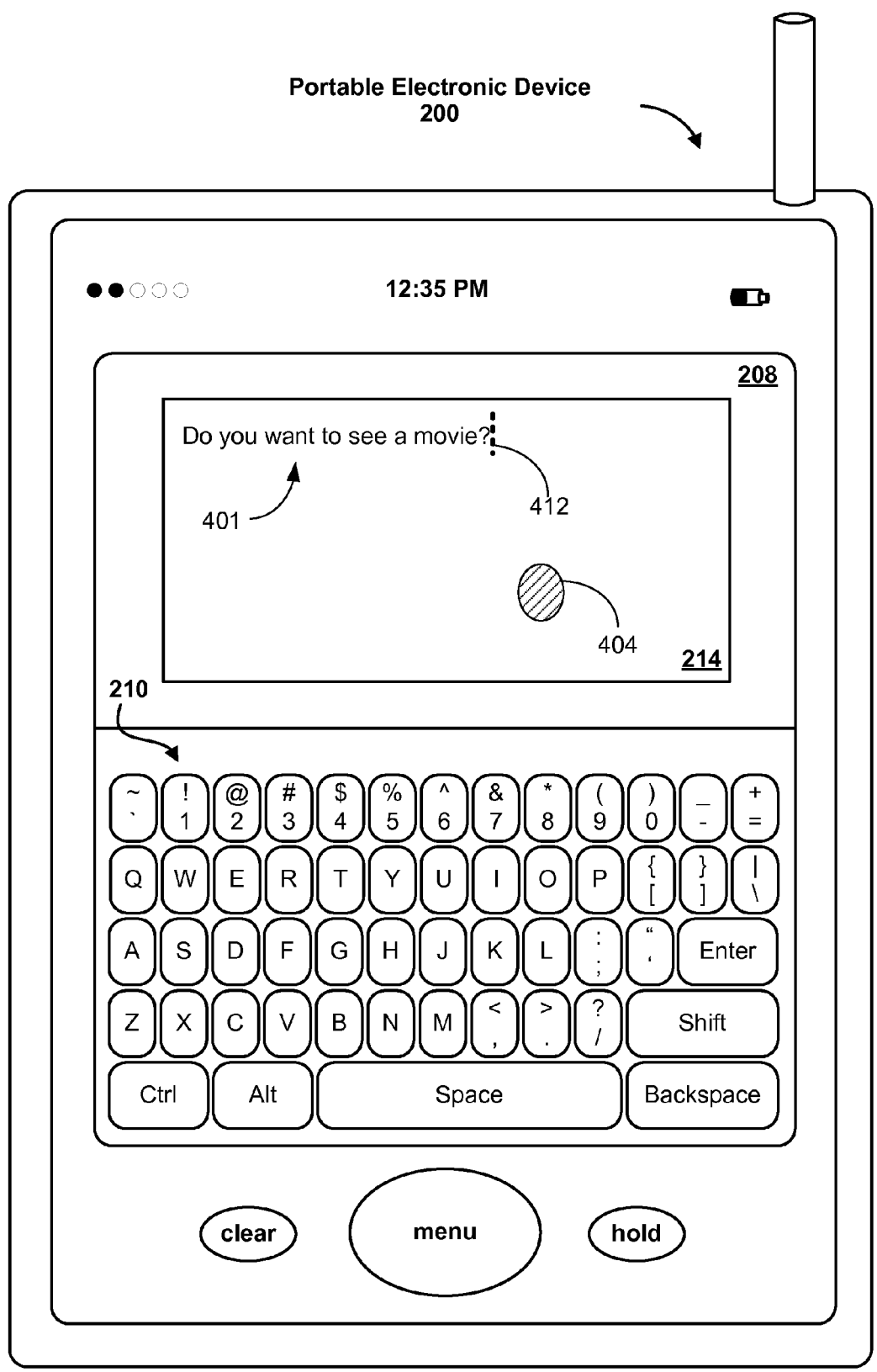
FIGS. 5A-5C illustrate an alternative user interface for positioning an insertion marker in accordance with some embodiments.
Figure 5B:
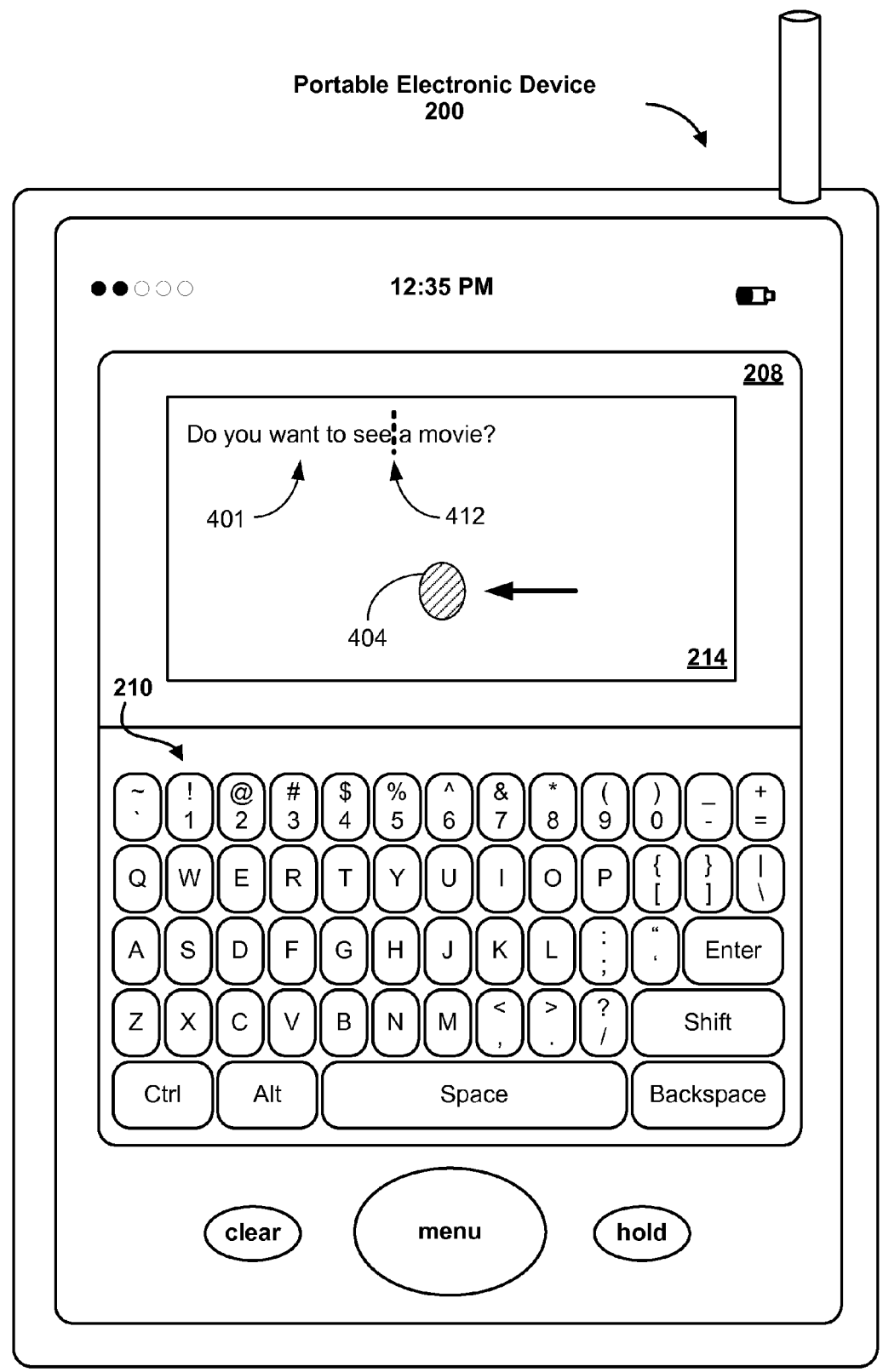
Figure 5C:
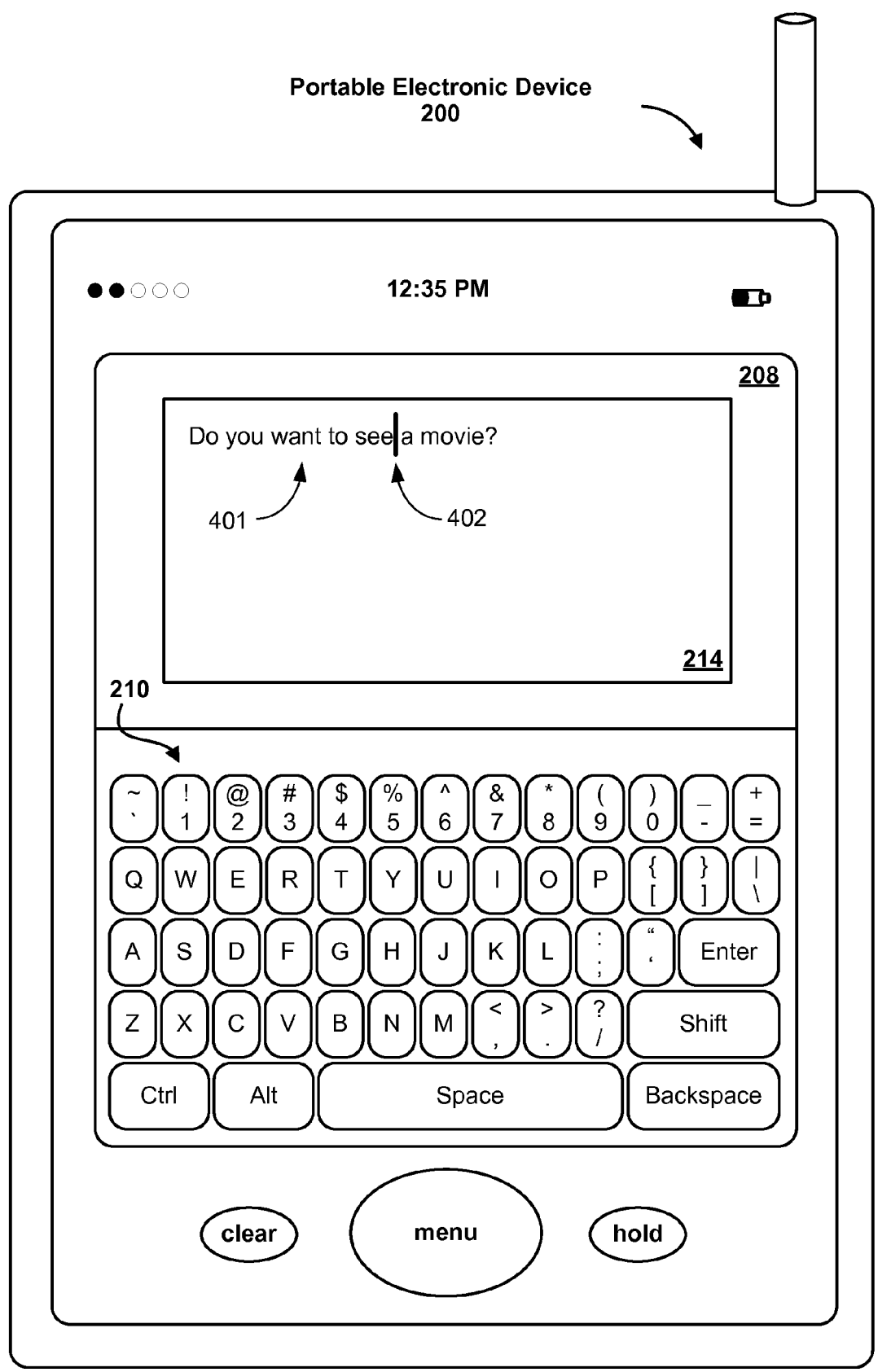

The embodiments described above provide visual feedback regarding control and position of the insertion marker to the user via an insertion marker placement aid. In some other embodiments, visual feedback may be provided without an insertion marker placement aid, as illustrated in FIGS. 5A-5C. Instead of displaying an insertion marker placement aid, the insertion marker 402 may be displayed with modifications when the user makes contact with the touch screen 208; the insertion marker is displayed as a modified insertion marker 412 (FIG. 5A). In some embodiments, the modified insertion marker 412 is displayed with a different color, brightness, pattern (e.g., dashed or patterned vs. solid) and/or size than the un-modified insertion marker 402.

The user may then move the contact area 404, moving the modified insertion marker 412 in the process, as shown in FIG. 5B. Once the modified insertion marker 412 is at the desired position, the user may break the contact, removing the contact area 404. After the break in contact, the modified insertion marker 412 reverts back to the normal insertion marker 402 (FIG. 5C); the display modifications from the unmodified insertion marker 402 to the modified insertion marker 412 are reversed. In other aspects, the modified insertion marker operates similarly to the insertion marker placement aid 406, described above. For example, the modified insertion marker may revert back to the normal insertion marker soon after the break of contact or after the elapse of a predetermined time after the break of contact.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device, comprising:
   a touch screen display;
   one or more processors;
   memory; and
   at least one program, wherein the at least one program is stored in the memory and configured to be executed by the one or more processors, the at least one program including instructions for:
      displaying an insertion marker in a first area of the touch screen display that includes characters entered using a soft keyboard, wherein the soft keyboard is located in a second area of the touch screen display that is separate from the first area;
      detecting a finger contact within the first area of the touch screen display;
      in response to detecting the finger contact, displaying an insertion marker placement aid in the first area of the touch screen display;
      detecting movement of the finger contact;
      moving the insertion marker and the insertion marker placement aid in accordance with the detected movement of the finger contact, wherein movement of the insertion marker is confined to the first area of the touch screen display; and,
      in response to detecting movement of the finger contact from the first area into the second area:
         maintaining display of the insertion marker placement aid;
         moving the insertion marker placement aid in accordance with the detected movement of the finger contact in the second area; and
         moving the insertion marker in the first area in accordance with the detected movement of the finger contact in the second area.

2. The device of claim 1, wherein the location of the finger contact is separate from the location of the insertion marker.

3. The device of claim 2, wherein the insertion marker placement aid overlaps the location of the insertion marker.

4. The device of claim 2, wherein the insertion marker placement aid overlaps the location of the insertion marker and the location of the finger contact.

5. The device of claim 1, further comprising instructions for removing the insertion marker placement aid if finger contact with the touch screen display is broken.

6. The device of claim 1, further comprising instructions for removing the insertion marker placement aid if finger contact with the touch screen display is no longer detected for a predetermined time.

7. A non-transitory computer readable storage medium storing one or more programs, the one or more programs comprising instructions, which when executed by a portable electronic device with a touch screen display, cause the device to:
- display an insertion marker in a first area of the touch screen display that includes characters entered using a soft keyboard, wherein the soft keyboard is located in a second area of the touch screen display that is separate from the first area;
- detect a finger contact within the first area of the touch screen display;
- in response to detecting the finger contact, display an insertion marker placement aid in the first area of the touch screen display;
- detect movement of the finger contact;
- move the insertion marker and the insertion marker placement aid in accordance with the detected movement of the finger contact, wherein movement of the insertion marker is confined to the first area of the touch screen display; and,
- in response to detecting movement of the finger contact from the first area into the second area:
  - maintain display of the insertion marker placement aid;
  - move the insertion marker placement aid in accordance with the detected movement of the finger contact in the second area; and
  - move the insertion marker in the first area in accordance with the detected movement of the finger contact in the second area.

8. The non-transitory computer readable storage medium of claim 7, wherein the location of the finger contact is separate from the location of the insertion marker.

9. The non-transitory computer readable storage medium of claim 8, wherein the insertion marker placement aid overlaps the location of the insertion marker.

10. The non-transitory computer readable storage medium of claim 8, wherein the insertion marker placement aid overlaps the location of the insertion marker and the location of the finger contact.

11. The non-transitory computer readable storage medium of claim 7, further comprising instructions that cause the device to remove the insertion marker placement aid if finger contact with the touch screen display is broken.

12. The non-transitory computer readable storage medium of claim 7, further comprising instructions that cause the device to remove the insertion marker placement aid if finger contact with the touch screen display is no longer detected for a predetermined time.

13. A method, comprising:
at a portable electronic device with a touch screen display:
- displaying an insertion marker in a first area of the touch screen display that includes characters entered using a soft keyboard, wherein the soft keyboard is located in a second area of the touch screen display that is separate from the first area;
- detecting a finger contact within the first area of the touch screen display;
- in response to detecting the finger contact, displaying an insertion marker placement aid in the first area of the touch screen display;
- detecting movement of the finger contact across the touch screen display;
- moving the insertion marker and the insertion marker placement aid in accordance with the detected movement of the finger contact, wherein movement of the insertion marker is confined to the first area of the touch screen display; and,
- in response to detecting movement of the finger contact from the first area into the second area:
  - maintaining display of the insertion marker placement aid;
  - moving the insertion marker placement aid in accordance with the detected movement of the finger contact in the second area; and
  - moving the insertion marker in the first area in accordance with the detected movement of the finger contact in the second area.

14. The method of claim 13, wherein the location of the finger contact is separate from the location of the insertion marker.

15. The method of claim 14, wherein the insertion marker placement aid overlaps the location of the insertion marker.

16. The method of claim 14, wherein the insertion marker placement aid overlaps the location of the insertion marker and the location of the finger contact.

17. The method of claim 13, further comprising removing the insertion marker placement aid if finger contact with the touch screen display is broken.

18. The method of claim 13, further comprising removing the insertion marker placement aid if finger contact with the touch screen display is no longer detected for a predetermined time.

19. A graphical user interface on a portable electronic device with a touch screen display, comprising:
- a soft keyboard located in a second area of the touch screen display that is separate from a first area;
- an insertion marker located in the first area of the touch screen display, the first area including characters entered using the soft keyboard; and
- an insertion marker placement aid located in the first area of the touch screen display, wherein:
the insertion marker is confined to move in the first area of the touch screen display in accordance with detected movement of a finger that contacts the touch screen display; and,
in response to detection of movement of the finger contact from the first area into the second area:
- the insertion marker placement aid continues to be displayed;
- the insertion marker placement aid is moved in accordance with the detected movement of the finger contact in the second area; and
- the insertion marker is moved within in the first area in accordance with the detected movement of the finger contact in the second area.

* * * * *